(12) United States Patent
Lin

(10) Patent No.: US 10,674,523 B2
(45) Date of Patent: Jun. 2, 2020

(54) CENTRALIZED SCHEDULING IN A DATA COMMUNICATION

(71) Applicant: Huawei Technologies Co., Ltd., Shenzhen, Guangdong (CN)

(72) Inventor: Bo Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 79 days.

(21) Appl. No.: 16/019,396

(22) Filed: Jun. 26, 2018

(65) Prior Publication Data

US 2018/0317243 A1 Nov. 1, 2018

Related U.S. Application Data

(63) Continuation of application No. PCT/CN2015/100126, filed on Dec. 31, 2015.

(51) Int. Cl.
*H04W 72/12* (2009.01)
*H04L 29/08* (2006.01)
(Continued)

(52) U.S. Cl.
CPC ......... *H04W 72/121* (2013.01); *H04L 1/1607* (2013.01); *H04L 43/08* (2013.01);
(Continued)

(58) Field of Classification Search
CPC ............... H04W 72/12; H04W 72/121; H04W 72/1263; H04W 72/14; H04W 72/048;
(Continued)

(56) References Cited

U.S. PATENT DOCUMENTS

2004/0228349 A1* 11/2004 Vrzic ............... H04W 72/1242
370/395.4
2009/0175226 A1 7/2009 Ren et al.
(Continued)

FOREIGN PATENT DOCUMENTS

CN 101444028 A 5/2009
CN 103384406 A 11/2013
(Continued)

OTHER PUBLICATIONS

Alcatel-Lucent, et al., "Modelling of communication constraints between CoMP transmission points," R1-110805, 3GPP TSG-RAN WG1 #64, Taipei, Feb. 21-25, 2011, 6 pages.
(Continued)

*Primary Examiner* — Mewale A Ambaye
(74) *Attorney, Agent, or Firm* — Fish & Richardson P.C.

(57) ABSTRACT

This application relates to a data transmission method. The method includes: determining, by a second node, first indication information based on basic information of a terminal device and/or network information, and sending the first indication information to a first node, where the first indication information is used for indicating that the terminal device is scheduled by the first node or is scheduled by the second node; if the first indication information indicates that the terminal device is scheduled by the first node, sending, by the second node to the first node, a data packet that has not been processed by using a scheduling function of the second node; or if the first indication information indicates that the terminal device is scheduled by the second node, sending, by the second node to the first node, a data packet that has been processed by using a scheduling function of the second node.

20 Claims, 10 Drawing Sheets

(51) Int. Cl.
  *H04L 12/26* (2006.01)
  *H04L 1/16* (2006.01)
  *H04W 72/14* (2009.01)

(52) U.S. Cl.
  CPC .............. *H04L 43/16* (2013.01); *H04L 67/10* (2013.01); *H04W 72/12* (2013.01); *H04W 72/1263* (2013.01); *H04W 72/14* (2013.01)

(58) Field of Classification Search
  CPC ...... H04W 52/244; H04L 43/08; H04L 43/16; H04L 1/1607; H04L 67/10
  See application file for complete search history.

(56) References Cited

U.S. PATENT DOCUMENTS

| | | | |
|---|---|---|---|
| 2012/0324511 A1* | 12/2012 | Koh | H04H 60/06 725/53 |
| 2013/0028210 A1 | 1/2013 | Gage | |
| 2015/0264615 A1* | 9/2015 | Zhao | H04W 72/0406 370/329 |
| 2016/0278061 A1* | 9/2016 | Peng | H04L 43/16 |

FOREIGN PATENT DOCUMENTS

| | | |
|---|---|---|
| CN | 104796918 A | 7/2015 |
| CN | 104811963 A | 7/2015 |
| EP | 2101528 A1 | 9/2009 |
| EP | 2239974 A2 | 10/2010 |
| EP | 2663153 A2 | 11/2013 |
| JP | 2015076761 A | 4/2015 |
| WO | 2010000094 A1 | 1/2010 |

OTHER PUBLICATIONS

China Mobile Communications Corporation, "Vision and Technologies for 5G", 3GPP RAN workshop on 5G RWS-150089, Sep. 17, 2015, 16 pages.

Office Action issued in Japanese application No. 2018/534596, dated May 22, 2019, 7 pages.

Office Action issued in Chinese Application No. 201580084207.4 dated Oct. 29, 2019, 13 pages (with English translation).

* cited by examiner

CENTRALIZED SCHEDULING IN A DATA COMMUNICATION

CROSS-REFERENCE TO RELATED APPLICATIONS

This application is a continuation of International Application No. PCT/CN2015/100126, filed on Dec. 31, 2015, the disclosure of which is hereby incorporated by reference in its entirety.

TECHNICAL FIELD

The present application relates to the field of communications technologies, and in particular, to a data transmission method and apparatus.

BACKGROUND

In a Long Term Evolution (LTE) system, a network architecture is classified into two types: a centralized architecture and a distributed architecture. For the distributed architecture, a base station has a baseband function and a radio frequency function. For the centralized architecture, a baseband function is provided in a baseband control unit (BBU), and a radio frequency function is provided in a remote radio unit (RRU). The BBU and the RRU need to be connected by using a large-capacity transmission medium such as an optical fiber or a microwave. The two types of architectures are independent of a terminal device. To be specific, once an architecture is determined, either distributed scheduling or centralized scheduling is used for all terminal devices in a cell.

Scheduling in the distributed architecture is scheduling by each base station, and an effect of inter-cell coordination between different base stations is poor. Consequently, inter-cell interference between base stations is relatively severe, and a throughput of a terminal device at a cell edge is reduced. However, an advantage of the distributed architecture is to save a bandwidth of a transmission network. Because the BBU and the RRU are integrated, an additional transmission network (fronthaul) is not required. An advantage of the centralized architecture is desirable system performance. Because radio resources of a plurality of cells may be scheduled in a centralized manner (for example, by using a CoMP technology), the radio resources of the plurality of cells may be coordinated, to reduce interference and increase a throughput of a cell edge user. However, the BBU is separated from the RRU, and data that is processed by a physical (PHY) layer is transmitted between the BBU and the RRU. A transmission network (usually referred to as fronthaul) between the BBU and the RRU needs to transmit a large amount of data, and a bandwidth requirement is very high. Further, when a frequency bandwidth supported by a cell increases, an air interface needs to transmit more data. Correspondingly, a bandwidth requirement of a transmission network also increases, causing a high pressure on the bandwidth of the transmission network.

SUMMARY

The present disclosure provides a data communications method and apparatus, so that a bandwidth requirement of a transmission network can be reduced while gains of centralized scheduling are obtained and system performance is ensured.

According to an aspect, an embodiment of this application provides a data transmission method. The method includes at least one first node and at least one second node, where both the first node and the second node have a scheduling function. The second node determines first indication information based on basic information of a terminal device and/or network information, and sends the first indication information to the first node, where the first indication information is used for indicating that the terminal device is scheduled by the first node or is scheduled by the second node. If the first indication information indicates that the terminal device is scheduled by the first node, the second node sends, to the first node, a data packet that has not been processed by using the scheduling function of the second node; or if the first indication information indicates that the terminal device is scheduled by the second node, the second node sends, to the first node, a data packet that has been processed by using the scheduling function of the second node.

Compared with the prior art, in the solution provided in the present disclosure, whether each terminal device is scheduled by the first node or is scheduled by the second node is dynamically determined based on basic information of the terminal device and/or network information, so that different scheduling manners (namely, centralized scheduling or distributed scheduling) are implemented for different terminal devices in a cell. In this case, compared with a centralized scheduling architecture mentioned in BACKGROUND, because distributed scheduling is used for some terminal devices in a cell, a bandwidth requirement of a transmission network is reduced. Compared with a distributed scheduling architecture mentioned in BACKGROUND, because centralized scheduling may be used for a terminal device located at a cell edge, system performance of the cell is improved.

In a possible design, when the basic information of the terminal device and/or the network information are changed/is changed, the second node negotiates with the first node to change a scheduling node. The second node determines second indication information based on the changed basic information of the terminal device and/or the changed network information, and sends the second indication information to the first node. The second indication information is used for indicating that the scheduling node of the terminal device is changed from the second node to the first node or is changed from the first node to the second node. Therefore, after the basic information of each terminal device and/or the network information are changed/is changed, whether the terminal device is scheduled by the first node or is scheduled by the second node is dynamically determined, so that different scheduling manners may be implemented for different terminal devices in the cell. While gains of centralized scheduling are obtained, the bandwidth requirement of the transmission network for a fixed scheduling node of each terminal device is reduced.

In another possible design, the first indication information includes a scheduling indication or a bearer type indication.

In another possible design, the first indication information further includes a bearer identifier of the terminal device, and the bearer identifier is used for indicating that data on a bearer corresponding to the bearer identifier of the terminal device is scheduled by the first node or is scheduled by the second node. Therefore, scheduling with finer granularity is implemented, to further explicitly achieve balance between the system performance and the bandwidth requirement of the transmission network.

In another possible design, the data packet that has not been processed by using the scheduling function of the second node includes a PDCP PDU or an IP PDU.

In another possible design, the data packet that has been processed by using the scheduling function of the second node includes a MAC PDU or PHY layer data.

More precisely, different data packets are sent to the first node by using the second node. Based on different data types, that is, based on an actual case of the terminal device or an actual case of the network, whether the terminal device is scheduled by the first node (distributed scheduling) or is scheduled by the second node (centralized scheduling) is dynamically determined. When scheduling by the first node is determined, the bandwidth requirement of the transmission network is reduced; or when scheduling by the second node is determined, the system performance of the cell is improved, so that the balance between the system performance and the bandwidth requirement of the transmission network is achieved.

In another possible design, the MAC PDU includes a MAC PDU that is processed by using a scheduling function of a MAC layer; or a MAC PDU that is processed by using a scheduling function of a MAC layer and a HARQ function of the MAC layer.

In another possible design, the basic information of the terminal device includes: a geographic location of the terminal device, service QoS information, a measurement report, a terminal capability, or priority information of the terminal device.

In another possible design, the first indication information or the second indication information is determined based on any one of the following conditions:

condition 1: when the geographic location of the terminal device is located at a cell edge, the terminal device is scheduled by the second node, or when the geographic location of the terminal device is not located at a cell edge, the terminal device is scheduled by the first node; condition 2: when a serving cell signal strength in the measurement report is less than a first threshold or a neighboring cell signal strength is greater than a second threshold, the terminal device is scheduled by the second node, or when a serving cell signal strength in the measurement report is greater than a first threshold or a neighboring cell signal strength is less than a second threshold, the terminal device is scheduled by the first node; condition 3: when a capability of the terminal device supports CoMP, the terminal device is scheduled by the second node, or when a capability of the terminal device does not support CoMP, the terminal device is scheduled by the first node; or condition 4: when load of the transmission network is light, the terminal device is scheduled by the second node, or when load of the transmission network is heavy, the terminal device is scheduled by the first node.

In another possible design, when a plurality of terminal devices are scheduled, the first indication information or the second indication information is determined based on a first condition and a second condition. The first condition includes any one of the following conditions: condition 1: when geographic locations of the terminal devices are located at a cell edge, the terminal devices are scheduled by the second node, or when geographic locations of the terminal devices are not located at a cell edge, the terminal devices are scheduled by the first node; condition 2: when a serving cell signal strength in the measurement report is less than a first threshold or a neighboring cell signal strength is greater than a second threshold, the terminal devices are scheduled by the second node, or when a serving cell signal strength in the measurement report is greater than a first threshold or a neighboring cell signal strength is less than a second threshold, the terminal devices are scheduled by the first node; or condition 3: when capabilities of the terminal devices support CoMP, the terminal devices are scheduled by the second node, or when capabilities of the terminal devices do not support CoMP, the terminal devices are scheduled by the first node. The second condition includes: when load of the transmission network is light, the terminal devices are scheduled by the second node, or when load of the transmission network is heavy, the terminal devices are scheduled by the first node.

According to another aspect, an embodiment of this application provides another data transmission method. The method includes at least one first node and at least one second node, where both the first node and the second node have a scheduling function. The first node receives first indication information, where the first indication information is used for indicating that a terminal device is scheduled by the first node or is scheduled by the second node. If the first indication information indicates that the terminal device is scheduled by the first node, the first node receives a data packet that is sent by the second node and that has not been processed by using the scheduling function of the second node; or if the first indication information indicates that the terminal device is scheduled by the second node, the first node receives a data packet that is sent by the second node and that has been processed by using the scheduling function of the second node.

According to the solution provided in this embodiment of the present disclosure, a scheduling node may be flexibly determined for each terminal device, to achieve balance between system performance and a bandwidth requirement of a transmission network. While gains of centralized scheduling are obtained, the bandwidth requirement of the transmission network for a fixed scheduling node of each terminal device is reduced.

In a possible design, when basic information of the terminal device and/or network information are changed/is changed, the first node negotiates with the second node to change a scheduling node. The first node receives second indication information sent by the second node, where the second indication information is determined by the second node based on the changed basic information of the terminal device and/or the changed network information, and the second indication information is used for indicating that scheduling of the terminal device by the second node is changed to scheduling of the terminal device by the first node, or scheduling of the terminal device by the first node is changed to scheduling of the terminal device by the second node. Therefore, after the basic information of each terminal device or the network information is changed, whether the terminal device is scheduled by the first node or is scheduled by the second node is dynamically determined, so that different scheduling manners may be implemented for different terminal devices in the cell. While gains of centralized scheduling are obtained, the bandwidth requirement of the transmission network for a fixed scheduling node of each terminal device is reduced.

In another possible design, the first indication information received by the first node further includes a bearer identifier of the terminal device, and the bearer identifier is used for indicating that data on a bearer corresponding to the bearer identifier of the terminal device is scheduled by the first node or is scheduled by the second node. Therefore, scheduling with finer granularity is implemented, to further explicitly achieve balance between the system performance and the bandwidth requirement of the transmission network.

In another possible design, the data packet that is sent by the second node and is received by the first node and that has not been processed by using the scheduling function of the second node includes a PDCP PDU or an IP PDU.

In another possible design, the data packet that is sent by the second node and is received by the first node and that has been processed by using the scheduling function of the second node includes a MAC PDU or PHY layer data.

More precisely, different data packets are sent to the first node by using the second node. Based on different data types, that is, based on an actual case of the terminal device or an actual case of the network, whether the terminal device is scheduled by the first node (distributed scheduling) or is scheduled by the second node (centralized scheduling) is dynamically determined. When scheduling by the first node is determined, the bandwidth requirement of the transmission network is reduced; or when scheduling by the second node is determined, the system performance of the cell is improved, so that the balance between the system performance and the bandwidth requirement of the transmission network is achieved.

In another possible design, the MAC PDU includes a MAC PDU that is processed by using a scheduling function of a MAC layer; or a MAC PDU that is processed by using a scheduling function of a MAC layer and a HARQ function of the MAC layer.

Compared with the prior art, in the solution provided in the present disclosure, whether each terminal device is scheduled by the second node (centralized scheduling) or is scheduled by the first node (distributed scheduling) is dynamically determined based on basic information (for example, load of a fronthaul transmission network) of the terminal device and/or network information. Different scheduling manners may be implemented for different terminal devices in a cell, to achieve the balance between the system performance and the bandwidth requirement of the transmission network.

Moreover, according to the solutions provided in the present disclosure, a scheduling manner of the terminal device may be dynamically determined as the basic information of the terminal device and/or the network information (for example, the load of the fronthaul transmission network) are changed/is changed. That is, the scheduling manner of the terminal device is changed.

According to the solution provided in this embodiment of the present disclosure, a scheduling node may be flexibly selected for each terminal device, to achieve balance between the system performance and the bandwidth requirement of the transmission network. While gains of centralized scheduling are obtained, the bandwidth requirement of the transmission network for a fixed scheduling node of each terminal device is reduced.

According to another aspect, an embodiment of the present disclosure provides a data transmission node. The node has a function for implementing behavior of the second node in the designs of the foregoing methods. The function may be implemented by hardware, or may be implemented by hardware executing corresponding software. The hardware or software includes one or more modules corresponding to the foregoing function.

In a possible design, a structure of the node includes a processor and a transmitter. The processor is configured to determine first indication information based on basic information of a terminal device and/or network information, where the first indication information is used for indicating that the terminal device is scheduled by a first node or is scheduled by the node. The transmitter is configured to: send the first indication information determined by the processor to the first node, and send, to the first node, a data packet that has not been processed by using a scheduling function of the node; or send, to the first node, a data packet that has been processed by using a scheduling function of the node.

According to another aspect, an embodiment of the present disclosure provides another data transmission node. The node has a function for implementing behavior of the first node in the designs of the foregoing methods. The function may be implemented by hardware, or may be implemented by hardware executing corresponding software. The hardware or software includes one or more modules corresponding to the foregoing function.

In a possible design, a structure of the node includes a receiver. The receiver is configured to receive first indication information, where the first indication information is used for indicating that the terminal device is scheduled by the node or is scheduled by a second node, and is configured to receive a data packet that is sent by the second node and that has not been processed by using a scheduling function of the second node, or is configured to receive a data packet that is sent by the second node and that has been processed by using a scheduling function of the second node.

According to still another aspect, an embodiment of the present disclosure provides a communications system. The system includes the data transmission node and the other data transmission node according to the foregoing aspects and a terminal device.

According to yet another aspect, an embodiment of the present disclosure provides a computer storage medium, configured to store a computer software instruction used by the foregoing base station, where the computer software instruction includes a program designed for executing the foregoing aspects.

According to yet another aspect, an embodiment of the present disclosure provides a computer storage medium, configured to store a computer software instruction used by the foregoing terminal device, where the computer software instruction includes a program designed for executing the foregoing aspects.

According to the solutions provided in the embodiments of the present disclosure, the scheduling node may be flexibly determined for each terminal device, to achieve balance between the system performance and the bandwidth requirement of the transmission network. While gains of centralized scheduling are obtained, the bandwidth requirement of the transmission network for a fixed scheduling node of each terminal device is reduced.

DESCRIPTION OF EMBODIMENTS

Although the LTE system is used as an example in BACKGROUND for introduction, a person skilled in the art should know that, the present disclosure is not only applicable to the LTE system, but also may be applicable to another wireless communications system, for example, a Global System for Mobile Communications (GSM) , a Universal Mobile Telecommunications System (UMTS), a Code Division Multiple Access (CDMA) system, and a new network system. Specific embodiments are described below by using the LTE system as an example.

A terminal device used in the embodiments of the present disclosure may be a device that provides a user with voice and/or data connectivity, a handheld device with a radio connection function, or another processing device connected to a wireless modem. A wireless terminal may communicate with one or more core networks by using a radio access network (RAN). The wireless terminal may be a mobile terminal, such as a mobile phone (or referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile station (Mobile), a remote station, an access point, a remote terminal, an access terminal, a user terminal, a user agent, a user device, or user equipment (UE).

A first node or a second node used in the embodiments of the present disclosure may be a base station, and the base station may be configured to mutually convert a received over-the-air frame and an IP packet and serve as a router between the wireless terminal and a remaining part of the access network, where the remaining part of the access network may include an Internet Protocol (IP) network. The base station may further coordinate attribute management of an air interface. For example, the base station may be abase transceiver station (BTS) in GSM or CDMA, or may be a NodeB (NodeB) in WCDMA, or may be an evolved NodeB (eNB or e-NodeB, evolved NodeB) in LTE. This is not limited in this application.

The second node used in the embodiments of the present disclosure may alternatively be a base station controller.

To better describe the technical solutions of the present disclosure, a distributed protocol stack architecture and a centralized protocol stack architecture in the prior art are separately described as follows.

Figure 1:
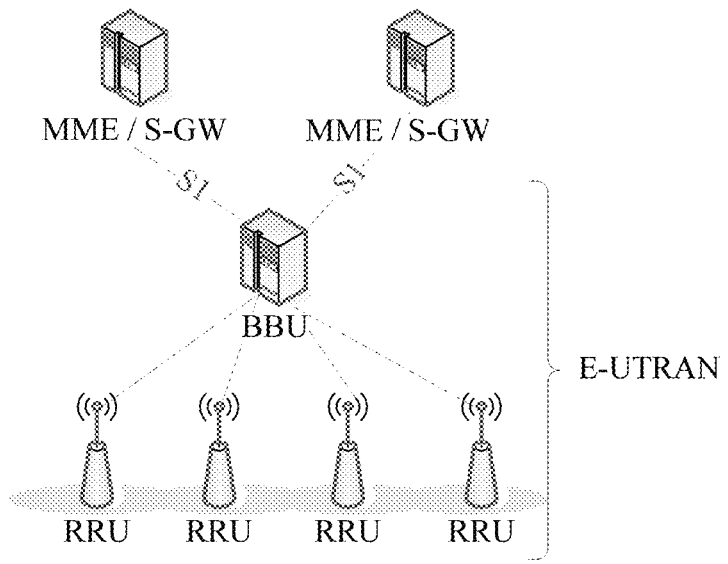
FIG. 1 is a schematic diagram of a distributed protocol stack architecture in the prior art of the present disclosure.

As shown in FIG. 1, the distributed protocol stack architecture means that both a baseband function and a radio frequency function are provided in a base station, and communication between the base station and a terminal device is performed according to a protocol stack shown in FIG. 1.

Figure 2:
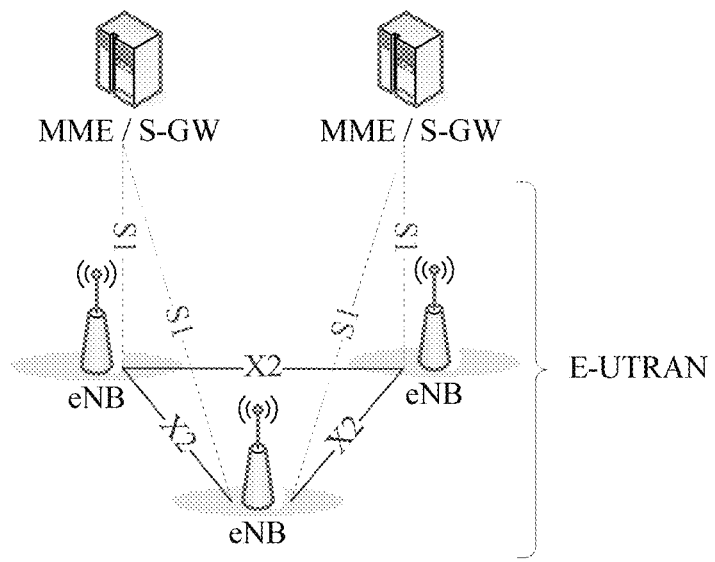
FIG. 2 is a schematic diagram of a centralized protocol stack architecture in the prior art of the present disclosure.

As shown in FIG. 2, the centralized protocol stack architecture means that a function of a base station is provided in a baseband control unit (BBU), a radio frequency function (RF) is provided in a remote radio unit (RRU), and the BBU and the RRU are connected by using an optical fiber, forming a BBU-RRU-UE communications link.

For the prior art, in an LTE system, each time of processing using the protocol stack causes additional overheads. For example, for downlink data, after a base station receives the data from an SGW, the data needs to be processed by a Packet Data Convergence Protocol (PDCP) layer, a Radio Link Control (RLC) layer, a Media Access Control (MAC) layer, and a PHY layer, and then the data is sent out by using a radio frequency module. The data processed by the PHY layer is transmitted between the BBU and the RRU in a centralized scheduling architecture of the LTE system. Because an Internet Protocol (IP) layer data packet that is not processed by the PDCP layer, the RLC layer, the MAC layer, and the PHY layer is transmitted between the SGW and the base station, a bandwidth requirement of the transmission network is very high. However, in a distributed scheduling architecture, the BBU and the RRU are integrated into one device. After the base station receives the data from the SGW, the data is processed by the PDCP layer, the RLC layer, the MAC layer, and the PHY layer inside the base station, and then the data is sent out by using the radio frequency module. A bandwidth requirement of the transmission network is relatively low.

According to a method provided in the embodiments of the present disclosure, a scheduling node is determined based on basic information of each terminal device and/or the network information. In other words, for each terminal device, a flexible protocol stack architecture is used in place of a conventional fixed protocol stack architecture. To be specific, the scheduling node of the terminal device is dynamically determined, that is, the terminal device is scheduled in a centralized manner or in a distributed manner.

On the other hand, when a plurality of terminal devices exist in a cell, a scheduling node may be determined based on basic information of each of the terminal devices and/or network information. To be specific, different scheduling manners (centralized scheduling or distributed scheduling) maybe implemented for different terminal devices in the cell. More precisely, distributed scheduling is used for some terminal devices in the cell, so that a bandwidth requirement of a transmission network is reduced. Centralized scheduling is used for some terminal devices in the cell, so that system performance of the cell is improved. To be specific, according to the solution provided in this embodiment of the present disclosure, a scheduling node may be flexibly determined for each terminal device, so as to achieve balance between the system performance and the bandwidth requirement of the transmission network. While gains of centralized scheduling are obtained, the bandwidth requirement of the transmission network for a fixed scheduling node of each terminal device is reduced.

Specifically, the technical solutions of the embodiments of the present disclosure are described with reference to the following different embodiments.

Figure 3:
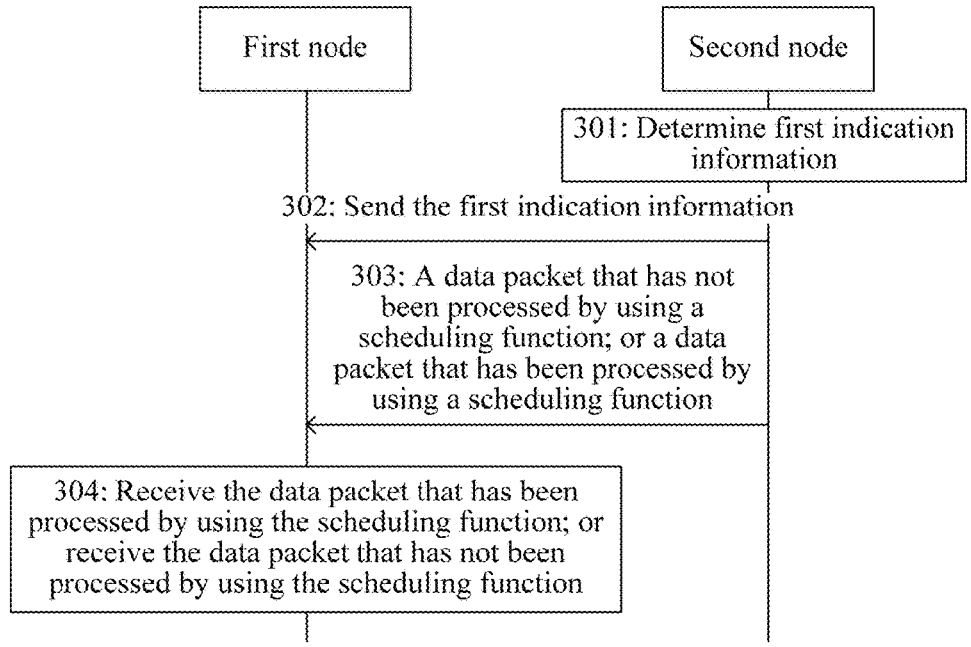
FIG. 3 is a schematic flowchart of an embodiment of a data transmission method according to the present disclosure.

FIG. 3 is a schematic flowchart of an embodiment of a data transmission method according to the present disclosure. The method includes at least one first node and at least one second node. Both the first node and the second node have a scheduling function, and the method includes the following steps:

301: The second node determines first indication information based on basic information of a terminal device and/or network information, where the first indication information is used for indicating that the terminal device is scheduled by the first node or is scheduled by the second node.

302: The second node sends the first indication information to the first node.

303: If the first indication information indicates that the terminal device is scheduled by the first node, the second node sends, to the first node, a data packet that has not been processed by using the scheduling function of the second node; or if the first indication information indicates that the terminal device is scheduled by the second node, the second node sends, to the first node, a data packet that has been processed by using the scheduling function of the second node.

304: The first node receives the data packet that has been processed by using the scheduling function, or receives the data packet that has not been processed by using the scheduling function, and may specifically perform the following operations.

Figure 3A:
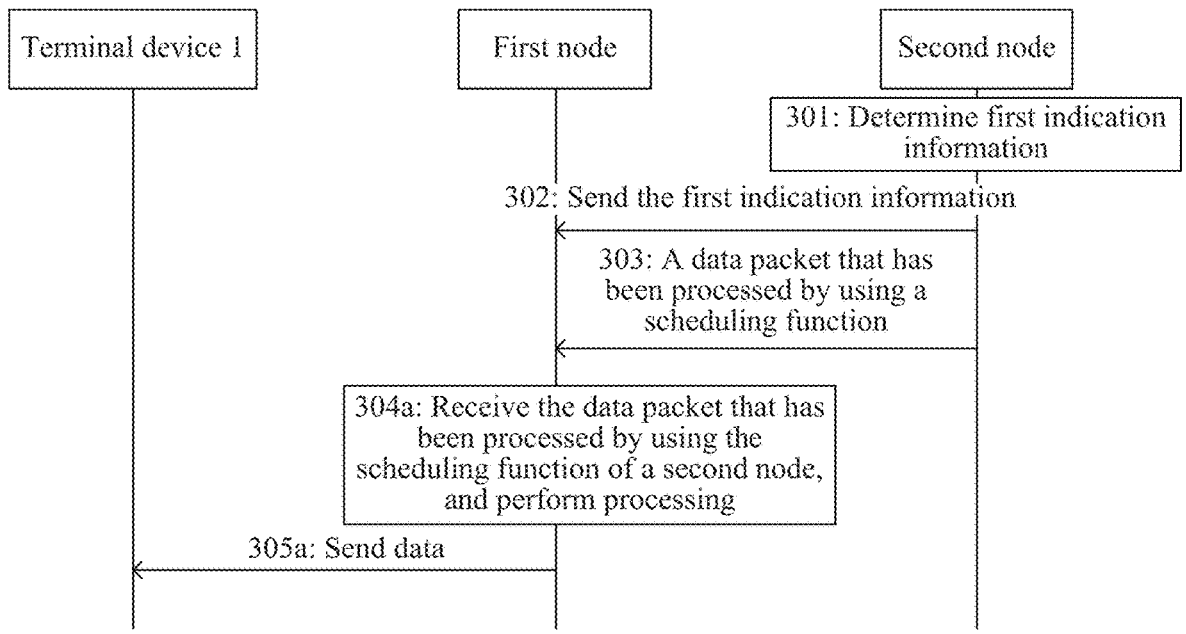
FIG. 3a is a schematic flowchart of an embodiment of a data transmission method according to the present disclosure.
Figure 3B:
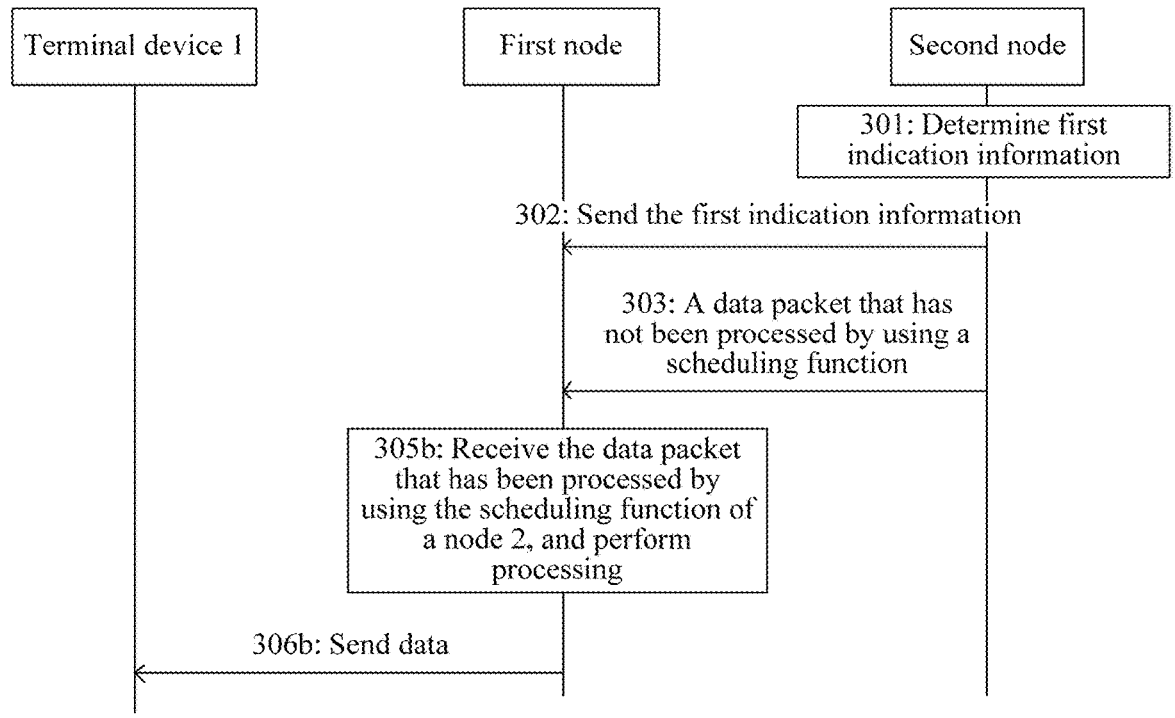
FIG. 3b is a schematic flowchart of an embodiment of a data transmission method according to the present disclosure.

As shown in FIG. 3a, if the terminal device is scheduled by the first node, the first node receives the data packet that has not been processed by using the scheduling function of the second node, and after processing the data packet that has not been processed by using the scheduling function of the second node, the first node sends the data packet to the terminal device. Alternatively, as shown in FIG. 3b, if the terminal device is scheduled by the second node, the first node receives the data packet that has been processed by using the scheduling function of the second node, and after processing the data packet that has been processed by using the scheduling function of the second node, the first node sends the data packet to the terminal device.

Compared with the prior art, according to the solution provided in the present disclosure, indication information is determined based on the basic information of the terminal device and/or network information, where the indication information is used for indicating a scheduling node of the terminal device, so that a scheduling node is flexibly determined for each terminal device. When scheduling gains are kept, a pressure on a bandwidth of a transmission network that is caused in a fixed protocol stack architecture when a bandwidth of a transmission network of a cell increases is avoided, and a bandwidth requirement of a transmission network for a fixed scheduling node of each terminal device is reduced.

In an example, when the basic information of the terminal device and/or network information are changed/is changed, the second node negotiates with the first node to change the scheduling node, determines second indication information based on the changed basic information of the terminal device and/or network information, and sends the second indication information to the first node. The second indication information is used for scheduling of the terminal device by the first node is changed to scheduling of the terminal device by the second node.

In another example, the first indication information may include a scheduling indication or a bearer type indication.

The first indication information further includes a bearer identifier of the terminal device. The bearer identifier is used for indicating that data on a bearer corresponding to the bearer identifier of the terminal device is scheduled by the first node or is scheduled by the second node.

In another example, that the second node sends, to the first node, a data packet that has not been processed by using the scheduling function of the second node includes: sending, by the second node, a PDCP PDU or an IP PDU to the first node.

In another example, that the second node sends, to the first node, a data packet that has been processed by using the scheduling function of the second node includes: sending, by the second node, a MAC PDU or PHY layer data to the first node.

The MAC PDU includes: a MAC PDU processed by using a scheduling function of a MAC layer; or a MAC PDU processed by using a scheduling function of a MAC layer or a hybrid automatic repeat request (HARQ) function of the MAC layer. For convenience of description, the MAC PDUs are collectively referred to as a MAC PDU in this application.

In another example, the basic information of the terminal device includes, but is not limited to, a geographic location of the terminal device, service QoS information, a measurement report, a terminal capability, or priority information of the terminal device. Certainly, the examples are merely for describing the embodiments of the present disclosure. As long as the basic information of the terminal device can be used as a basis for determining the first indication information or the second indication information, the basic information falls within the protection scope of the present disclosure, and details are not described herein.

The network information includes, but is not limited to, load information of the transmission network, for example, load information of a fronthaul transmission network. Certainly, the examples are merely for describing the embodiments of the present disclosure. As long as the network information of the terminal device can be used as a basis for determining the first indication information or the second indication information, the network information falls within the protection scope of the present disclosure, and details are not described herein.

Further, both the first indication information and the second indication information may be determined based on a correspondence in Table 2.

TABLE 2

|  | Scheduled by the second node | Scheduled by the first node |
|---|---|---|
| Geographic location | Located at a cell edge | Not located at a cell edge |
| Measurement report | A serving cell signal strength is less than a first threshold or a neighboring cell signal strength is greater than a second threshold | A serving cell signal strength is greater than a first threshold or a neighboring cell signal strength is less than a second threshold |
| UE capability | Supporting CoMP | Not supporting CoMP |

Further, the network information includes, but is not limited to, the load information of the transmission network. Specifically, when the scheduling node of the terminal device is determined or changed, the scheduling node may be determined based on the network information (for example, load of the fronthaul transmission network). For example, when the load of the transmission network is heavy, to reduce a fronthaul bandwidth, it may be determined that distributed scheduling is used for the terminal device. For a specific determination correspondence, refer to Table 3.

TABLE 3

|  | Scheduled by the second node | Scheduled by the first node |
|---|---|---|
| Network information | Light load of the transmission network | Heavy load of the transmission network |

For example, the network information may include load of the transmission network, load of a hardware resource, or comprehensive load information. Information such as load of hardware and the network is considered. For specific determining steps, refer to the foregoing descriptions, and details are not described herein again.

During specific implementation, a threshold may be set for the load of the transmission network. If the load reaches or exceeds a pre-defined threshold, the load is considered to be heavy; or if the load does not reach a pre-defined threshold, the load is considered to be light.

It should be particularly emphasized that, the geographic location, measurement report, or UE capability in Table 2 and the network information in Table 3 may be separately used, or any one of the geographic location, measurement report, and UE capability in Table 2 may be used in combination with the network information in Table 3. In combination, each determination criterion is used as a determination condition, and final determination is comprehensively performed by using an implementation method.

In an example, the basic information of the terminal device may be used in combination with the network information. If a plurality of terminal devices exist, for example, when the load of the transmission network is heavy, some terminal devices located at a cell edge are selected to be scheduled by the second node (centralized scheduling), and other terminal devices located at a cell edge are scheduled by the first node (distributed scheduling). Alternatively, in another example, for example, when the load of the transmission network is light, some terminal devices whose serving cell signal strength is greater than the first threshold are selected to be scheduled by the second node (centralized scheduling), and other terminal devices whose serving cell signal strength is greater than the first threshold are selected to be scheduled by the first node (distributed scheduling).

Each possible implementation is described in detail in each specific embodiment with reference to the accompanying drawings.

The technical solutions described in the present disclosure may be applicable to the LTE system or other wireless communications systems using various wireless technologies. In addition, the technical solutions are also applicable to a subsequent evolved system of the LTE system, such as a 5th Generation 5G system. For clarity, only the LTE system is used as an example for description herein. In the LTE system, data transmission is performed between a network device and the terminal device.

The scheduling function described in the present disclosure may be a scheduling function of a MAC layer, and includes at least a radio resource allocation function, and optionally, may further include at least one of the following functions or characteristic processing: a logic information mapping function, a multiplexing function, a demultiplexing function, a scheduling information report, priority processing, logical channel priority, or a transmission formation selection function. In the present disclosure, scheduling of data of the terminal device by a node is equivalent to that the data is processed by using a scheduling function of the node or the node allocates a radio resource for the data. Certainly, this is merely for describing the examples in the technical solutions of the present disclosure. The present disclosure includes but is not limited to the foregoing examples.

The technical solutions provided in the present disclosure include a method for flexibly configuring a protocol stack architecture based on basic information of each terminal device and/or network information. For example, whether centralized scheduling or distributed scheduling is used for each terminal device is determined based on a location or a service characteristic of the terminal device.

For example, centralized scheduling by the second node may be used for a terminal device whose geographic location is a cell edge, and distributed scheduling by the first node may be used for a terminal device whose geographic location is not a cell edge. In this case, for a terminal device that is located at a cell edge, performance is ensured and a throughput is increased because centralized scheduling reduces inter-cell interference. For a terminal device that is not located at a cell edge, a requirement on the transmission network is greatly reduced because radio frequency, PHY and/or MAC layer functions are provided in the first node. Usually, based on a system evaluation model, it is considered that terminal devices located at a cell edge accounts for about 20% of all terminal devices of a cell. Based on this assumption, compared with a static centralized scheduling architecture in the prior art, because distributed scheduling is used for 80% non-edge terminal devices, a fronthaul bandwidth can be greatly reduced. Because centralized scheduling is used for 20% edge terminal devices, radio resources used by the terminal devices are well coordinated, to reduce inter-cell interference, thereby ensuring throughputs of these edge terminal devices.

To better describe the method in this embodiment of the present disclosure, scheduling of the terminal device by the first node is distributed scheduling, and scheduling of the terminal device by the second node is centralized scheduling. The example is only used for better describing this embodiment of the present disclosure, and the present disclosure includes but is not limited to the example. Certainly, the method used in the present disclosure may also be applicable to a scenario where there are a plurality of terminal devices and/or a plurality of nodes, and details are not described herein again.

Figure 4:
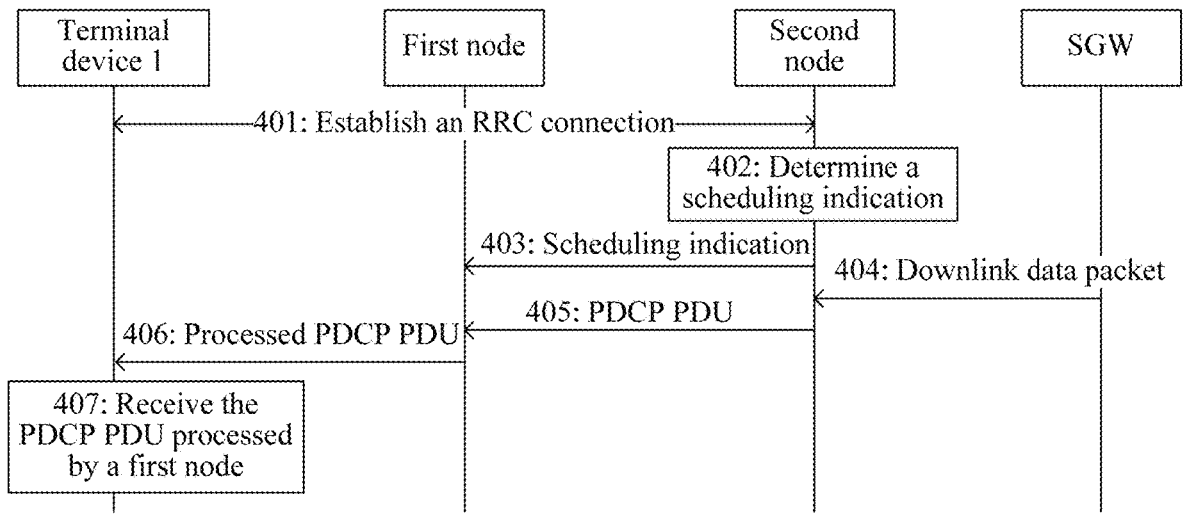
FIG. 4 is a schematic flowchart of another embodiment of a data transmission method according to the present disclosure.

As shown in FIG. 4, this embodiment provides another data transmission method. Scheduling of a terminal device by a first node is distributed scheduling, and scheduling of the terminal device by a second node is centralized scheduling. The method may include the following steps.

401: Establish an RRC connection between the second node and a terminal device 1.

402: The second node determines a scheduling indication based on basic information of the terminal device 1 and/or network information.

It should be particularly noted that, the basic information may include a geographic location of the terminal device, service QoS information, a measurement report, a terminal capability, or priority information of the terminal device. The network information may include load of a transmission network, for example, load of a fronthaul transmission network. These are merely examples used in the present disclosure. The present disclosure includes but is not limited to the examples.

For example, the second node may determine the scheduling indication based on the basic information of the terminal device in Table 2 and/or the network information in Table 3. Details are not described herein again.

403: The second node sends the scheduling indication to the first node, where the scheduling indication is used for indicating that the terminal device 1 is scheduled by the first node.

Optionally, a bearer is established between the first node and the second node, a radio bearer is established between the first node and the terminal device 1, and an S1 bearer is established between the second node and an SGW.

404: The second node receives a downlink data packet of the terminal device 1 that is sent by the SGW.

405: The second node performs PDCP layer processing on the downlink data packet to generate a PDCP PDU, and then sends the PDCP PDU to the first node.

It should be particularly noted that the second node converts downlink data of the terminal device 1 into a PDCP PDU and then sends the PDCP PDU. When scheduling of the terminal device 1 is changed to scheduling by the second node, a PDCP layer of the second node may continue to provide a service to the terminal device 1. Because the PDCP layer has a serial number SN, a data packet that is successfully transmitted and a data packet that is not successfully transmitted may be learned from a status report, so that the data packet that is not successfully transmitted continues to be transmitted, to ensure service continuity of the terminal device 1.

406: After receiving a PDCP PDU data packet sent by the second node, the first node processes the data packet and then sends the data packet to the terminal device 1 by using a radio link between the first node and the terminal device 1.

Specifically, after receiving the PDCP PDU, after the first node performs RLC layer, MAC layer scheduling function processing and PHY layer processing on the PDCP PDU, the first node sends the PDCP PDU to the terminal device 1 by using a radio frequency function.

407: The terminal device 1 receives the data packet that is sent by the first node and that is processed by the first node.

Figure 5:
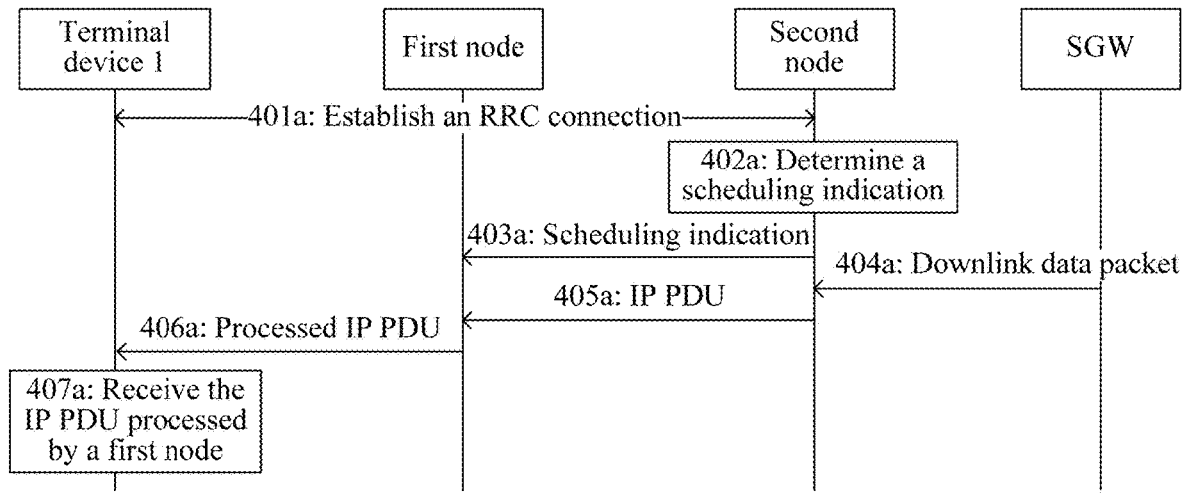
FIG. 5 is a schematic flowchart of another embodiment of a data transmission method according to the present disclosure.

As shown in FIG. 5, this embodiment provides another data transmission method. This embodiment is similar to the embodiment shown in FIG. 4, and differences between this embodiment and the embodiment shown in FIG. 4 are as follows.

405a: The second node performs IP layer processing on the downlink data packet of the terminal device 1 to generate an IP PDU, and then sends the IP PDU to the first node.

406a: After receiving the IP PDU data packet sent by the second node, the first node processes the IP PDU and then sends the IP PDU to the terminal device 1 by using a radio link between the first node and the terminal device 1.

Specifically, after receiving the IP PDU, after the first node performs PDCP layer, RLC layer, MAC layer scheduling function processing and PHY layer processing on the IP PDU, the first node sends the IP PDU to the terminal device 1 by using a radio frequency function.

407: The terminal device 1 receives the data packet that is sent by the first node and that is processed by the first node.

Figure 6:
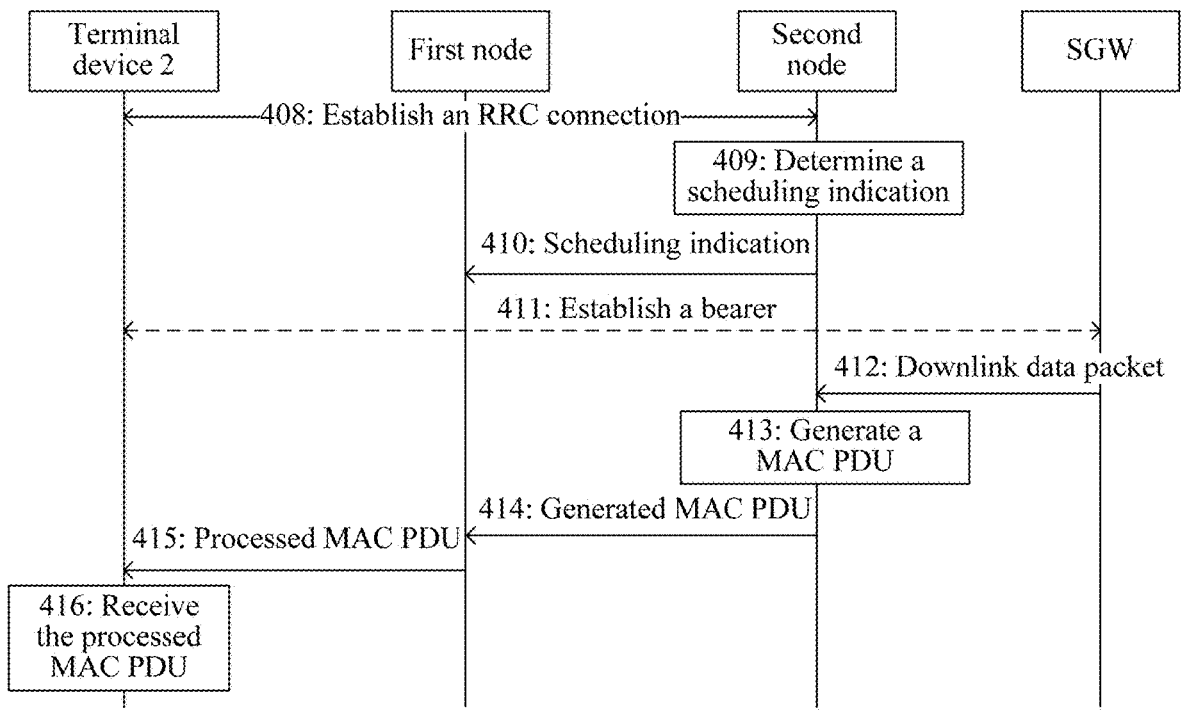
FIG. 6 is a schematic flowchart of another embodiment of a data transmission method according to the present disclosure.

As shown in FIG. 6, to better describe the technical solutions in the embodiments of the present disclosure, the following further describes the embodiments of the present disclosure. Scheduling of the terminal device by the first node is distributed scheduling, and scheduling of the terminal device by the second node is centralized scheduling. The method may include the following steps.

408: Establish an RRC connection between a terminal device 2 and the second node.

409: The second node determines a scheduling indication based on basic information of the terminal device 2 and/or network information.

Specifically, refer to the foregoing embodiment for content included in the basic information of the terminal device and/or the network information.

Specifically, for a method for determining the scheduling indication, refer to the foregoing embodiment, and details are not described herein again.

410: The second node sends the scheduling indication to the first node, where the scheduling indication is used for indicating that the terminal device 2 is scheduled by the second node.

Optionally, 411: Establish a radio bearer between the second node and the terminal device 2, and establish an S1 bearer between the second node and an SGW.

412: The second node receives downlink data sent by the SGW.

413: The second node schedules the downlink data at a MAC layer of the second node, and generates a MAC PDU.

Specifically, PDCP layer processing, RLC layer processing, and MAC layer scheduling processing may be performed by the second node on the data, to generate the MAC PDU.

414: The second node sends the MAC PDU of the terminal device 2 to the first node.

415: After receiving the MAC PDU of the terminal device 2, the first node performs PHY layer processing on the MAC PDU of the terminal device 2, and then sends the processed MAC PDU to the terminal device 2 by using radio frequency function processing and by using a radio link between the first node and the terminal device 2.

416: The terminal device 2 receives the data that is sent by the first node and that is processed by the first node.

Figure 7:
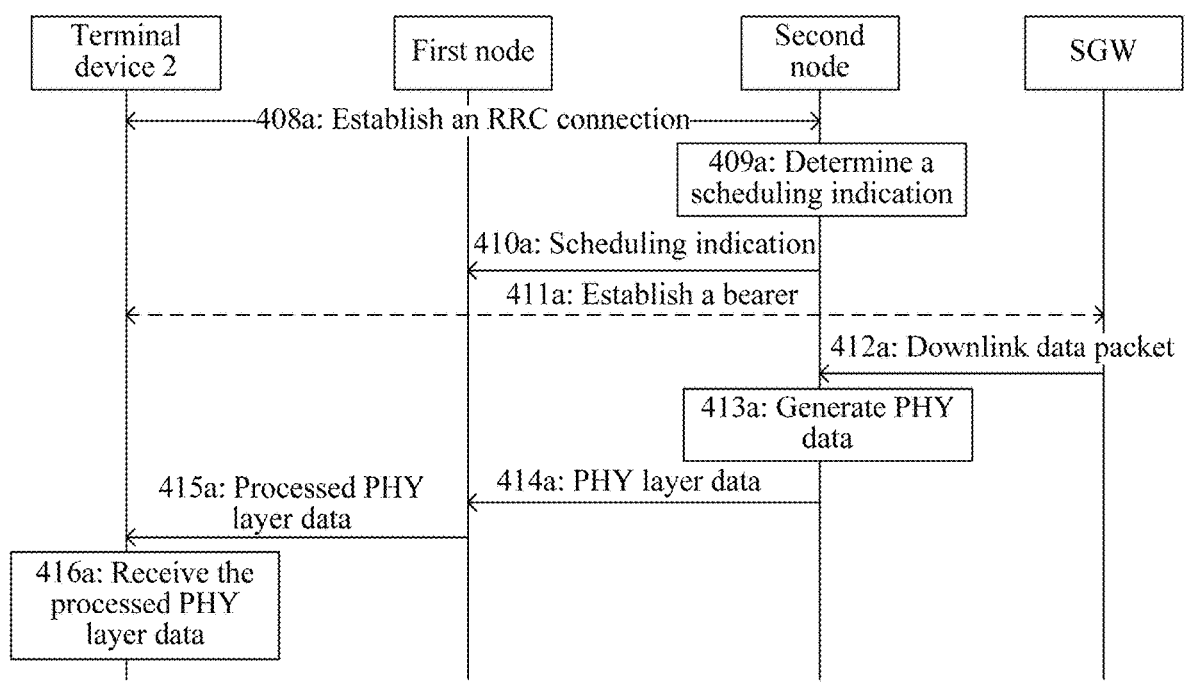
FIG. 7 is a schematic flowchart of another embodiment of a data transmission method according to the present disclosure.

As shown in FIG. 7, this embodiment provides another data transmission method. This embodiment is similar to the embodiment shown in FIG. 6, and differences between this embodiment and the embodiment shown in FIG. 6 are as follows.

413a: The second node schedules downlink data of the terminal device 2 at a PHY layer of the second node, and generates PHY layer data.

Specifically, PDCP layer processing, RLC layer processing, MAC layer processing, and PHY layer processing may be performed by the second node on the data, to generate the PHY layer data.

414a: The second node sends the PHY layer data of the terminal device 2 to the first node.

415a: After receiving the PHY layer data of the terminal device 2, the first node sends the PHY layer data of the terminal device 2 to the terminal device 2 by using a radio link between the first node and the terminal device 2.

416a: The terminal device 2 receives the data sent by the first node.

Compared with the prior art, according to the solutions provided in the embodiments shown in FIGS. 4 to 7, based on the basic information of the terminal device and/or the network information, scheduling by the first node (distributed scheduling) or scheduling by the second node (centralized scheduling) is dynamically determined. When scheduling by the first node is determined, the bandwidth requirement of the transmission network is reduced; or when scheduling by the second node is determined, the system performance of the cell is improved. Further, a scheduling manner of the terminal device in the cell may change as the terminal device or the network information (for example, load of the fronthaul transmission network) changes, so that the balance between the system performance and the bandwidth requirement of the transmission network is achieved.

Figure 9:
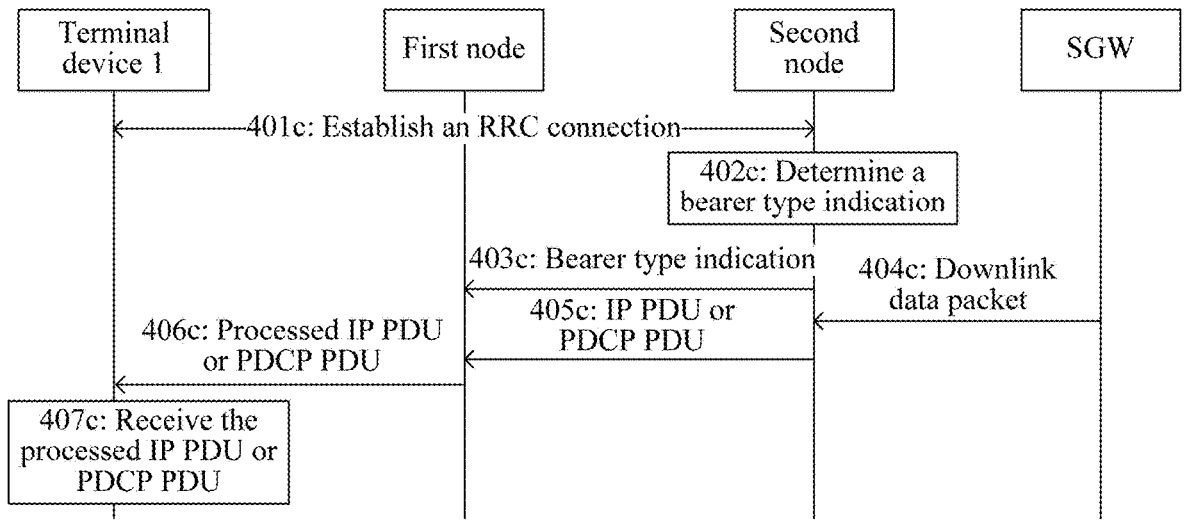
FIG. 9 is a schematic flowchart of another embodiment of a data transmission method according to the present disclosure.

FIG. 9 is another embodiment of a data transmission method according to the present disclosure. This embodiment is similar to the embodiment shown in FIG. 4, and differences between this embodiment and the embodiment shown in FIG. 4 are as follows.

402c: The second node determines a bearer type indication based on basic information of the terminal device 1 and/or network information.

It should be particularly noted that, a bearer type in the present disclosure may be a type of data carried by a bearer between the first node and the second node. For example, when an IP PDU or a PDCP PDU is transmitted by the bearer between the first node and the second node, this bearer type is referred to as an IP PDU or a PDCP PDU herein. If a MAC PDU or PHY layer data is transmitted by the bearer between the first node and the second node, this bearer type is referred to as a MAC PDU or PHY layer data herein.

Therefore, in the embodiments of the present disclosure, the bearer type between the first node and the second node is the PDCP PDU or the MAC PDU. To be specific, the type of the data carried by the bearer between the first node and the second node is the PDCP PDU or MAC PDU. The examples are only used for understanding the present disclosure. The present disclosure includes but is not limited to the examples. For another bearer type, as long as a scheduling node of the terminal device falls within the protection scope of the present disclosure, details are not described herein.

Specifically, the bearer type indication determined based on basic information of the terminal device 1 and/or network information may be determined based on correspondences shown in Table 4 and Table 5. To be specific, when the bearer type is the MAC PDU or PHY layer data, the terminal device 1 is scheduled by the second node; or when the bearer type is the PDCP PDU or the IP PDU, the terminal device 1 is scheduled by the first node, so that the first node may obtain scheduling information based on the bearer type.

TABLE 4

|  | When the bearer type is a MAC PDU or PHY layer data, scheduling is performed by the second node | When the bearer type is a PDCP PDU or an IP PDU, scheduling is performed by the first node |
| --- | --- | --- |
| Geographic location | Located at a cell edge | Not located at a cell edge |
| Measurement report | A serving cell signal strength is less than a first threshold or a neighboring cell signal strength is greater than a second threshold | A serving cell signal strength is greater than a first threshold or a neighboring cell signal strength is less than a second threshold |
| UE capability | Supporting CoMP | Not supporting CoMP |

TABLE 5

|  | When the bearer type is a MAC PDU or PHY layer data, scheduling is performed by the second node | When the bearer type is a PDCP PDU or an IP PDU, scheduling is performed by the first node |
| --- | --- | --- |
| Network information | Light load | Heavy load |

The network information may include load of the transmission network, load of a hardware resource, or comprehensive load information. Information such as load of hardware and the network is considered.

403c: The second node sends the bearer type indication to the first node, where the bearer type indication is used for indicating that a type of the data packet transmitted between the second node and the first node is a PDCP PDU or IP PDU.

It should be particularly noted that, if the data packet transmitted between the second node and the first node is the PDCP PDU or the IP PDU, the first node may learn that the terminal device 1 is scheduled by the first node.

Figure 10:
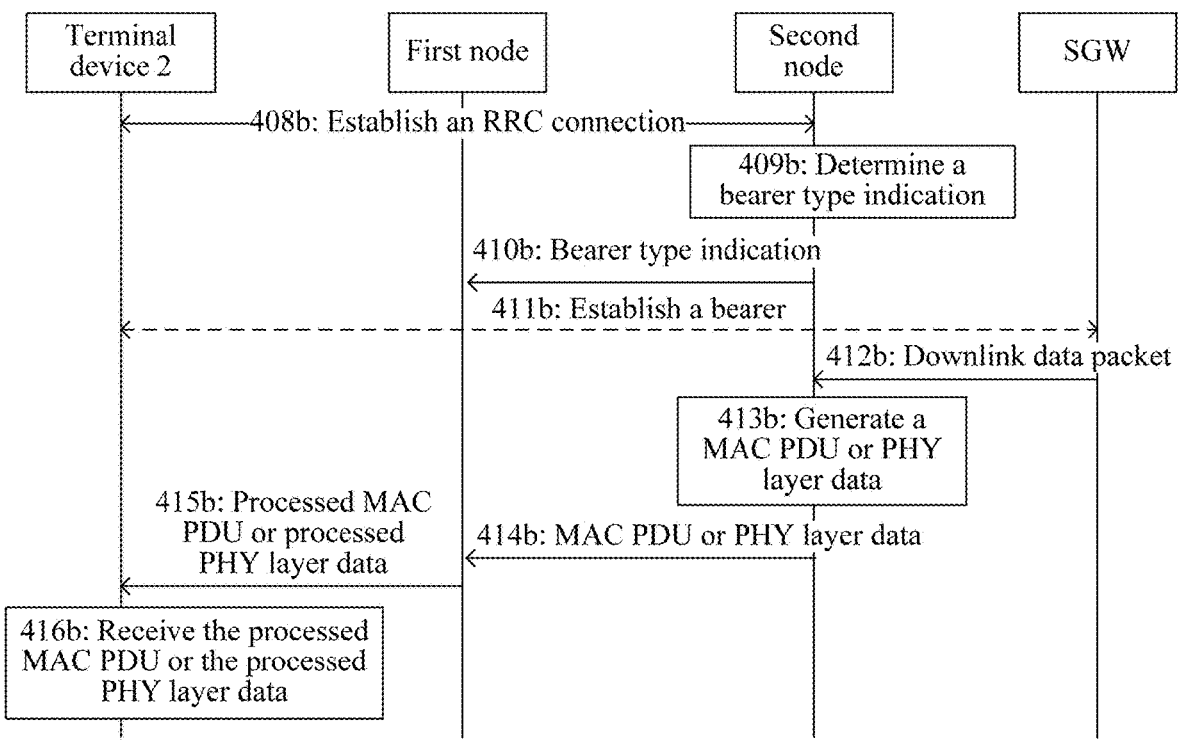
FIG. 10 is a schematic flowchart of another embodiment of a data transmission method according to the present disclosure.

FIG. 10 is a schematic flowchart of another embodiment of a data transmission method according to the present disclosure. This embodiment is similar to the embodiment shown in FIG. 6, and differences between this embodiment and the embodiment shown in FIG. 6 are as follows.

409b: The second node determines a bearer type indication based on basic information of the terminal device 2 and/or network information.

Specifically, the bearer type indication determined by the second node based on the basic information of the terminal device and/or the network information may be determined based on correspondences shown in Table 4 and Table 5.

410b: The second node sends the bearer type indication to the first node, where the bearer type indication is used for indicating that a type of the data packet transmitted between the second node and the first node is a MAC PDU or PHY layer data.

The embodiment shown in FIGS. 9 or 10 may further be elaborated as follows: The basic information of the terminal device 1 further includes a bearer identifier, where the bearer identifier is used for indicating that data on a bearer corresponding to the bearer identifier of the terminal device is scheduled by the first node or is scheduled by the second node; or the bearer identifier is used for indicating that a data type of data on a bearer corresponding to the bearer identifier of the terminal device is a MAC PDU or PHY layer data , or a PDCP PDU or the IP PDU.

It should be particularly noted that, if the data packet transmitted between the second node and the first node is the MAC PDU or the PHY layer data, the first node may learn that the terminal device 1 is scheduled by the second node.

It should be particularly noted that, if the data packet transmitted between the second node and the first node is the PDCP PDU or the IP PDU, the first node may learn that the terminal device 1 is scheduled by the first node.

If the type of the data packet transmitted between the second node and the first node is the PDCP PDU, when receiving the PDCP PDU from the second node, the first node needs to perform RLC layer processing, MAC layer processing, and PHY layer processing in sequence on the PDCP PDU, and then sends the PDCP PDU to the terminal device by using a radio frequency function. Because a MAC layer is responsible for scheduling and includes a scheduling function processing process, when the bearer type indication is the PDCP PDU, the bearer type indication may implicitly indicate that the terminal device 1 is scheduled by the first node. The case is similar when the bearer type indication is the IP PDU, and details are not described herein again.

If the type of the data packet transmitted between the second node and the first node is the MAC PDU, when receiving the MAC PDU from the second node, the first node needs to process the MAC PDU at a PHY layer, and sends the MAC PDU to the terminal device by using a radio frequency function. Because a MAC layer is responsible for scheduling and includes a scheduling function processing process, when the bearer type indication is the MAC PDU, the bearer type indication may implicitly indicate that the terminal device 1 is scheduled by the second node. The case is similar when the bearer type indication is the PHY layer data, and details are not described herein again.

It should be particularly noted that, the embodiments shown in 9 and FIG. 10 may be separately used, may be used in combination, or may be used in combination with another embodiment. Details are not described herein again.

Figure 11:
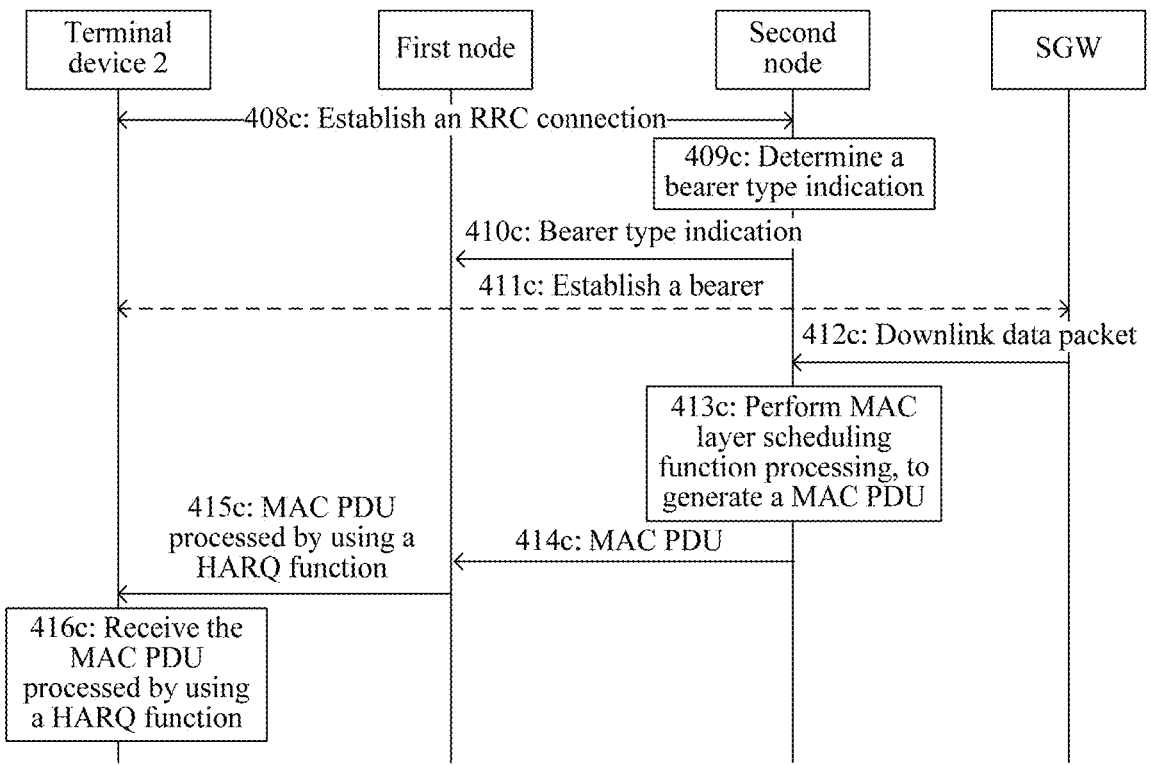
FIG. 11 is a schematic flowchart of another embodiment of a data transmission method according to the present disclosure.

As shown in FIG. 11, to better understand the present disclosure, the present disclosure further provides another embodiment. This embodiment is similar to the embodiment shown in FIG. 6, and differences between this embodiment and the embodiment shown in FIG. 6 are as follows.

413c: The second node performs MAC layer scheduling function processing on data of the terminal device 2, to generate a MAC PDU.

It should be particularly noted that, the scheduling function processing described in the present disclosure may be scheduling function processing at a MAC layer, and includes at least one of the following functions or characteristics: a logic information mapping function, a multiplexing function, a demultiplexing function, a scheduling information report, priority processing, logical channel priority, or a transmission formation selection function. Certainly, the examples are only used for describing the technical solutions of the present disclosure. The present disclosure includes but is not limited to the examples.

It should be noted that, a function of the MAC layer is divided into a scheduling function and a HARQ function. Such division may be predefined, maybe specified in a protocol, or may be user-defined. Details are not described herein.

414c: The second node sends the MAC PDU of the terminal device 2 to the first node.

415c: After receiving the MAC PDU of the terminal device 2, the first node performs HARQ function processing at the MAC layer on the MAC PDU of the terminal device 2 and then sends the MAC PDU to the terminal device 2 by using a radio link between the first node and the terminal device 2.

Figure 12:
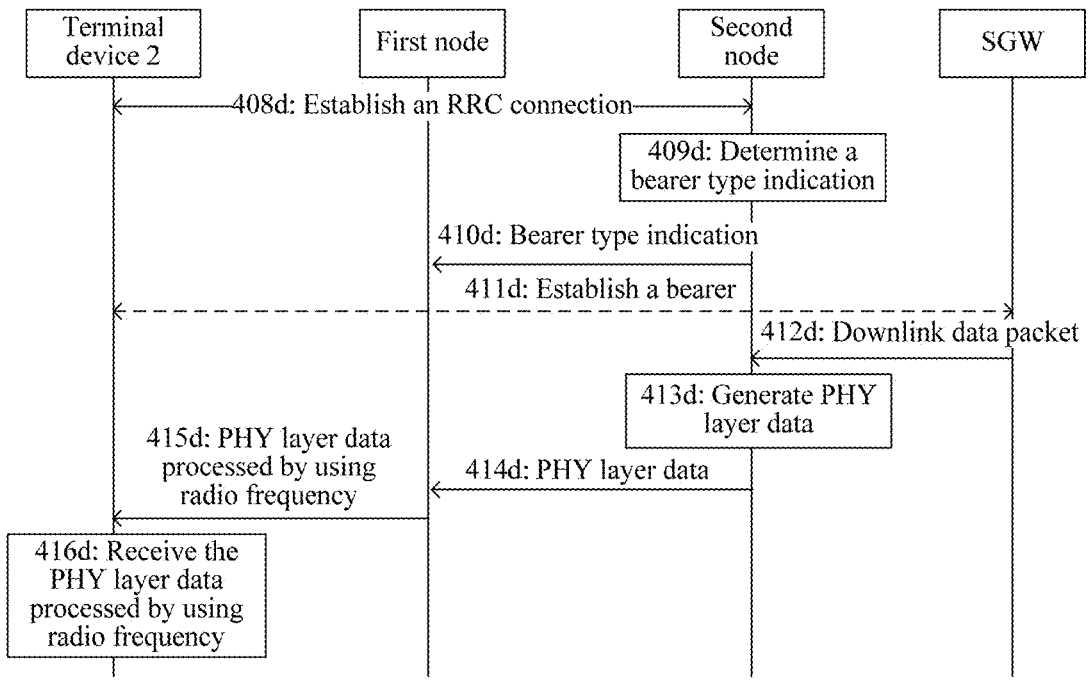
FIG. 12 is a schematic flowchart of another embodiment of a data transmission method according to the present disclosure.

As shown in FIG. 12, to better understand the present disclosure, the present disclosure further provides another embodiment. This embodiment is similar to the embodiment shown in FIG. 6, and differences between this embodiment and the embodiment shown in FIG. 6 are as follows.

413d: The second node performs PHY layer processing on the terminal device 2, to generate PHY layer data.

Specifically, after the second node performs PDCP layer processing, RLC layer processing, and MAC layer scheduling function processing on the downlink data packet, the PHY layer data is generated after at least one of the following physical layer function processing is performed on the data packet:

a CRC function, a channel coding function, a physical layer HARQ processing function, a channel interleaving function, a scrambling code function, modulation or layer mapping, and a precoding function.

Certainly, the examples are only used for understanding the present disclosure. The present disclosure includes but is not limited to the examples.

414d: The second node sends the PHY layer data of the terminal device 2 to the first node.

415d: After receiving the PHY layer data of the terminal device 2, the first node performs radio frequency function processing on the PHY layer data and then sends the PHY layer data to the terminal device 2 by using a radio link between the first node and the terminal device 2.

416d: The terminal device 2 receives the data that is sent by the first node and that is processed by the first node.

The present disclosure further provides another embodiment. This embodiment is similar to the embodiment shown in FIG. 12, and a difference between this embodiment and the embodiment shown in FIG. 12 is that another protocol stack type is used. For example, a PHY layer is divided into two parts, a function that is in a PHY layer function and that is related to the terminal device 2 is reserved in the second node, and a function that is in the PHY layer function and that is not related to the terminal device 2 is placed in the first node. Compared with the foregoing solution of complete PHY layer data, this architecture may further reduce a fronthaul bandwidth requirement.

It should be particularly noted that, a PDU that has been processed by using a scheduling function of the MAC layer and that has not been processed by using a HARQ function of the MAC layer is also referred to as a MAC PDU in the present disclosure.

It should be particularly noted that, data that has been processed by a part of a PHY layer is also referred to as PHY layer data in the present disclosure.

For the solutions shown in FIGS. 9 to 12, compared with the prior art, in the solutions provided in the present disclosure, whether centralized scheduling or distributed scheduling is used for each terminal device is dynamically determined based on basic information of the terminal device and/or network information (for example, load of a fronthaul transmission network). Different scheduling manners (centralized scheduling or distributed scheduling) maybe implemented for different terminal devices in a cell. Moreover, a scheduling manner of a terminal device in the cell may change as the terminal device or the network information (for example, the load of the fronthaul transmission network) changes, thereby achieving balance between the system performance and the bandwidth requirement of the transmission network based on an actual network operation status.

In this case, compared with a centralized scheduling architecture mentioned in BACKGROUND, because distributed scheduling is used for some terminal devices in a cell, a bandwidth requirement of a transmission network is reduced. Compared with a distributed scheduling architecture mentioned in BACKGROUND, because centralized scheduling may be used for some edge terminal devices in the cell, system performance of the cell is improved.

Figure 8:
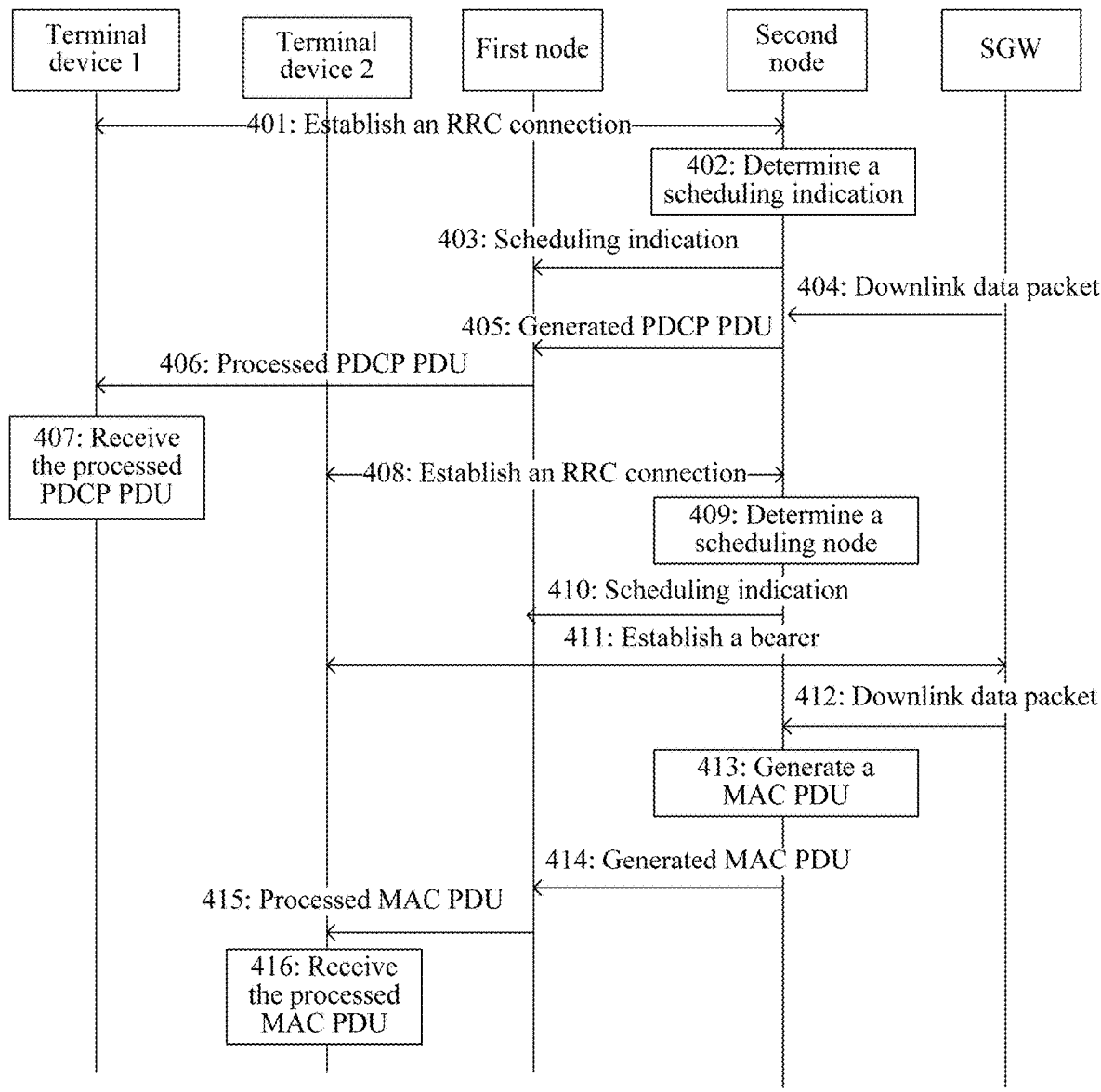
FIG. 8 is a schematic flowchart of another embodiment of a data transmission method according to the present disclosure.

To better understand the technical solutions in the present disclosure, the embodiments of the present disclosure are further described. For example, the embodiment shown in FIGS. 4, 5, or 9 is referred to as a first method, and the embodiment shown in FIGS. 6, 7, 10, 11, or 12 is referred to as a second method. Herein, the first method and the second method may be separately used, or may be used in combination. When the two methods are used in combination, the two methods may not be sequentially performed. For example, the method of the embodiment shown in FIG. 4 may be used in combination with the method of the embodiment shown in FIG. 6. Specifically, as shown in FIG. 8, in FIG. 8, the embodiment shown in FIG. 4 is performed before the embodiment shown in FIG. 6 is performed. The example is only used for describing the technical solutions of the present disclosure. The present disclosure includes but is not limited to the examples.

The present disclosure provides another embodiment of a data transmission method. An application scenario of this embodiment is that a second node has determined first indication information based on basic information of a terminal device and/or network information. The method includes the following steps.

1301: When the basic information of the terminal device and/or the network information are changed/is changed, the second node negotiates with a first node to change a scheduling node.

Specifically, the second node may send a change indication to the first node, and the first node feeds back a change response. Alternatively, the first node may send a change indication to the second node, and the second node feeds back a change response.

Specifically, for content included in the network information, refer to the descriptions of the foregoing embodiments. For content included in the basic information of the terminal device, refer to the descriptions of the foregoing embodiments. Details are not described herein again.

Specifically, refer to the descriptions of the scheduling indication and the bearer type indication in the foregoing embodiments. Details are not described herein again.

1302: The second node determines second indication information based on the changed basic information of the terminal device and/or the changed network information.

Specifically, the second indication information may be determined based on the correspondence mentioned in Table 2 or Table 3. Alternatively, specifically, the second indication information may be determined based on the correspondence mentioned in Table 4 or Table 5. Details are not described herein again.

1303: Send the second indication information to the first node, where the second indication information is used for indicating that the scheduling node of the terminal device is changed from the first node to the second node.

To be specific, original scheduling of the terminal device by the first node is changed to scheduling by the second node; or original scheduling of the terminal device by the second node is changed to scheduling by the first node.

Figure 13:
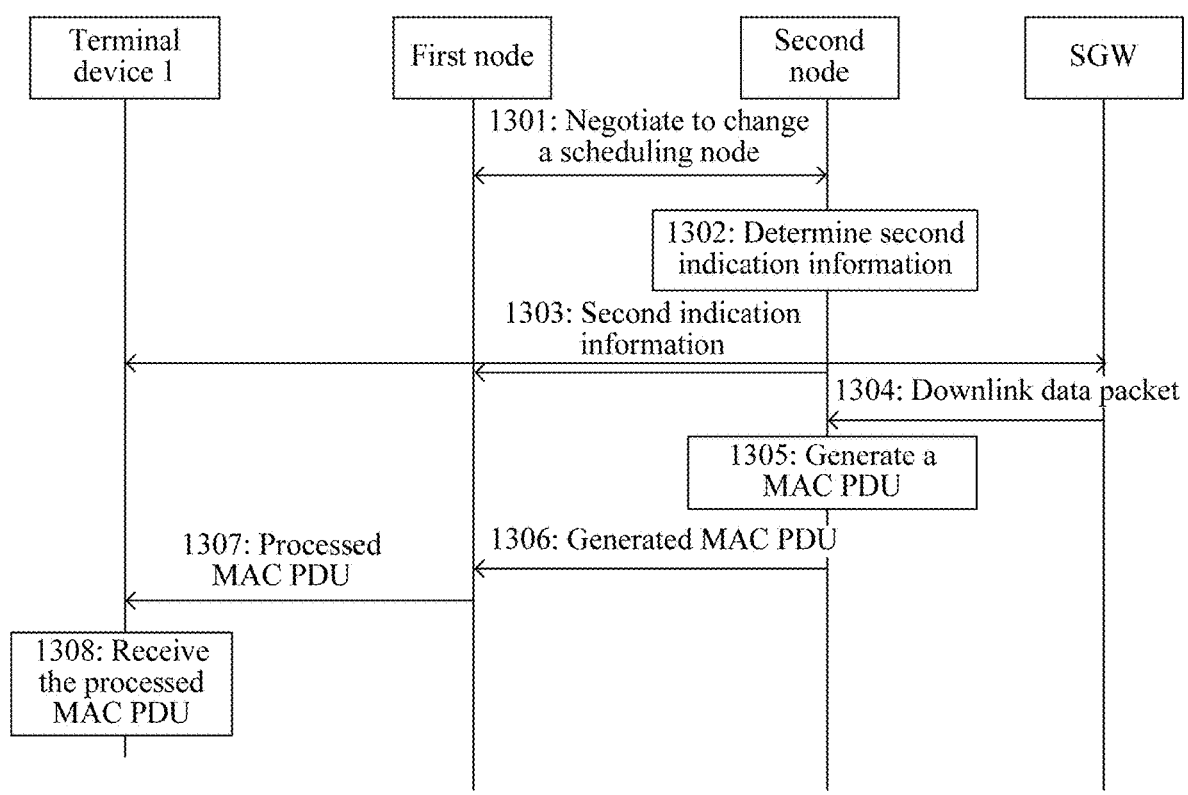
FIG. 13 is a schematic flowchart of another embodiment of a data transmission method according to the present disclosure.

To further describe the embodiment, FIG. 13 shows a further example of the present disclosure. Certainly, the example is only used for understanding the technical solutions of the present disclosure. For a specific scheduling method, refer to the foregoing embodiments. Details are not described herein again.

1304: The second node receives downlink data sent by an SGW.

1305: The second node schedules downlink data of the terminal device 2 at a MAC layer, to generate a MAC PDU.

Specifically, PDCP layer processing, RLC layer processing, and MAC layer scheduling function processing may be performed on the data, to generate the MAC PDU.

1306: The second node sends the MAC PDU of the terminal device 2 to the first node.

1307: After receiving the MAC PDU of the terminal device 2, the first node performs PHY layer processing on the MAC PDU of the terminal device 2 and then sends the MAC PDU to the terminal device 2 by using radio frequency function processing and by using a radio link between the first node and the terminal device 2.

1308: The terminal device 2 receives the data that is sent by the first node and that is processed by the first node.

According to the solution provided in the present disclosure, a scheduling manner of a terminal device in a cell may change as the terminal device or the network information (for example, load of a fronthaul transmission network) changes. According to the solution provided in the present disclosure, whether centralized scheduling or distributed scheduling is used for each terminal device is dynamically determined based on basic information of the terminal device and/or network information (for example, load of a fronthaul transmission network). Different scheduling manners (centralized scheduling or distributed scheduling) may be implemented for different terminal devices in a cell, thereby achieving balance between system performance and a bandwidth requirement of a transmission network.

To better understand the technical solutions in the present disclosure, the embodiments of the present disclosure are further described. The embodiment shown in FIG. 13 may be separately used, and is applicable to a scenario in which the basic information of the terminal device changes and the scheduling node needs to be determined again, or may be used in combination with another embodiment. For example, the embodiment shown in FIGS. 4, 5, or 9 is referred to as a first method, and the embodiment shown in FIGS. 6, 7, 10, 11, or 12 is referred to as a second method. Herein, the method shown in FIG. 13 is used in combination with the first method and/or the second method. When the two methods are used in combination, the first method and/or the second method may be performed before the method shown in FIG. 13 is performed.

Based on the embodiment described above, for example, when the first indication information is used for indicating that the terminal device is scheduled by the second node, the first indication information further carries a resource indication. The first node sends data processed by the first node to the terminal device by using a resource indicated by the resource indication.

It should be particularly noted herein that the scheduling used in the embodiments of the present disclosure includes at least allocation of a radio resource.

Figure 14:
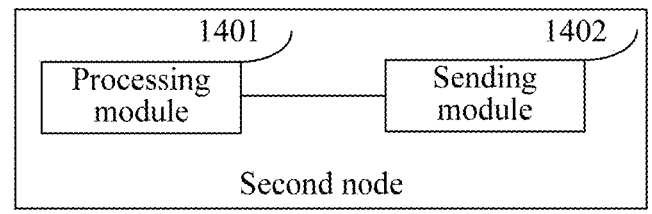
FIG. 14 is a schematic structural diagram of an embodiment of a data transmission node according to the present disclosure.

FIG. 14 shows a data transmission node according to an embodiment of the present disclosure. For convenience of description, the transmission node is referred to as the node below. It should be particularly noted that both the node and a first node have a scheduling function, and the node has a function for implementing the second node or a behavior of the second node in the designs of the foregoing methods.

This embodiment includes:

a processing module 1401, configured to determine first indication information based on basic information of a terminal device and/or network information, where the first indication information is used for indicating that the terminal device is scheduled by the first node or is scheduled by the node; and a sending module 1402, configured to send the first indication information determined by the processing module 1401 to the first node, where the sending module 1402 is configured to: when the first indication information determined by the processing module 1401 indicates that the terminal device is scheduled by the first node, send, to the first node, a data packet that has not been processed by using the scheduling function of the node; or is configured to: when the first indication information determined by the processing module indicates that the terminal device is scheduled by the node, send, to the first node, a data packet that has been processed by using the scheduling function of the node.

For a beneficial effect of this embodiment, refer to the foregoing method embodiments. Details are not described herein again.

Further, the processing module 1401 is further configured to: when the basic information of the terminal device and/or the network information are changed/is changed, negotiate with the first node to change a scheduling node, and determine second indication information based on the changed basic information of the terminal device and/or the changed network information.

Further, the sending module 1402 is further configured to send the second indication information determined by the processing module 1401 to the first node. The second indication information is used for indicating that the scheduling node of terminal device is changed from the node to the first node or is changed from the first node to the node.

The first indication information sent by the sending module 1402 includes a scheduling indication or a bearer type indication.

Further, the first indication information sent by the sending module 1402 further includes a bearer identifier of the terminal device. The bearer identifier is used for indicating that data on a bearer corresponding to the bearer identifier of the terminal device is scheduled by the first node or is scheduled by the node.

The sending module is specifically configured to send a PDCP PDU or an IP PDU to the first node; or send a MAC PDU to the first node; or send PHY layer data to the first node.

The MAC PDU sent by the sending module to the first node includes: a MAC PDU that is processed by using a scheduling function of a MAC layer; or a MAC PDU that is processed by using a scheduling function of a MAC layer and a HARQ function of the MAC layer.

The basic information of the terminal device includes: a geographic location of the terminal device, service QoS information, a measurement report, a terminal capability, or priority information of the terminal device. The network information includes load information of a transmission network.

The processing module is specifically configured to determine the first indication information or the second indication information based on any one of the following conditions:

condition 1: when the geographic location of the terminal device is located at a cell edge, the terminal device is scheduled by the node, or when the geographic location of the terminal device is not located at a cell edge, the terminal device is scheduled by the first node;

condition 2: when a serving cell signal strength in the measurement report is less than a first threshold or a neighboring cell signal strength is greater than a second threshold, the terminal device is scheduled by the node, or when a serving cell signal strength in the measurement report is greater than a first threshold or a neighboring cell signal strength is less than a second threshold, the terminal device is scheduled by the first node;

condition 3: when a capability of the terminal device supports CoMP, the terminal device is scheduled by the node, or when a capability of the terminal device does not support CoMP, the terminal device is scheduled by the first node; or condition 4: when load of the transmission network is light, the terminal device is scheduled by the node, or when load of the transmission network is heavy, the terminal device is scheduled by the first node.

The processing module is specifically configured to: when a plurality of terminal devices are scheduled, determine the first indication information or the second indication information based on a first condition or a second condition, where the first condition includes any one of the following conditions:

condition 1: when geographic locations of the terminal devices are located at a cell edge, the terminal devices are scheduled by the apparatus, or when geographic locations of the terminal devices are not located at a cell edge, the terminal devices are scheduled by the first node;

condition 2: when a serving cell signal strength in the measurement report is less than a first threshold or a neighboring cell signal strength is greater than a second threshold, the terminal devices are scheduled by the node, or when a serving cell signal strength in the measurement report is greater than a first threshold or a neighboring cell signal strength is less than a second threshold, the terminal devices are scheduled by the first node; or condition 3: when capabilities of the terminal devices support CoMP, the terminal devices are scheduled by the node, or when capabilities of the terminal devices do not support CoMP, the terminal devices are scheduled by the first node; and the second condition includes: when load of the transmission network is light, the terminal devices are scheduled by the node, or when load of the transmission network is heavy, the terminal devices are scheduled by the first node.

Figure 14A:
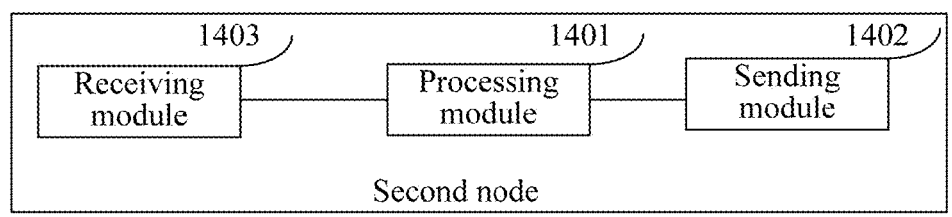
FIG. 14*a* is a schematic structural diagram of an embodiment of a data transmission node according to the present disclosure.

Optionally, as shown in FIG. 14*a*, the node may further include a receiving module 1403, configured to receive downlink data sent by an SGW.

It should be particularly noted that, in this embodiment of the present disclosure, a physical apparatus corresponding to the processing module may be a processor and a physical apparatus corresponding to the sending module may be a transmitter. Optionally, a physical apparatus corresponding to the receiving module may be a receiver.

Figure 15:
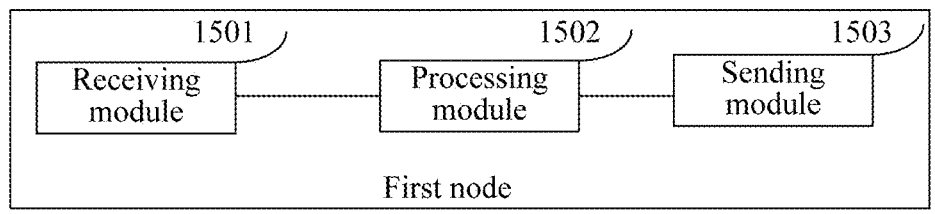
FIG. 15 is a schematic structural diagram of another embodiment of a data transmission node according to the present disclosure.

FIG. 15 is another data transmission node according to an embodiment of the present disclosure. For convenience of description, the other data transmission node is referred to as the node for short, and both the node and a second node have a scheduling function. The node has a function for implementing the first node or a behavior of the first node in the designs of foregoing methods. The node includes:

a receiving module 1501, configured to receive first indication information, where the first indication information is used for indicating that the terminal device is scheduled by the node or is scheduled by the second node, where the receiving module 1501 is configured to: if the first indication information indicates that the terminal device is scheduled by the node, receive a data packet that is sent by the second node and that has not been processed by using the scheduling function of the second node; or if the first indication information indicates that the terminal device is scheduled by the second node, receive a data packet that is sent by the second node and that has been processed by using the scheduling function of the second node;

a processing module 1502, configured to process the data packet that is received by the receiving module and that has not been processed by using the scheduling function of the second node; or configured to process the data packet that is received by the receiving module and that has been processed by using the scheduling function of the second node; and a sending module 1503, configured to send data processed by the processing module.

For a beneficial effect of this embodiment, refer to the foregoing method embodiments. Details are not described herein again.

Further, the processing module 1502 is further configured to: when basic information of the terminal device and/or network information are changed/is changed, negotiate, by the node, with the second node to change a scheduling node.

Further, the receiving module 1501 is configured to: after the processing module 1502 determines to change the scheduling node, receive second indication information sent by the second node, where the second indication information is determined by the second node based on the changed basic information of the terminal device and/or the changed network information, and the second indication information is used for indicating that scheduling of the terminal device by the second node is changed to scheduling of the terminal device by the node, or scheduling of the terminal device by the node is changed to scheduling of the terminal device by the second node.

Further, the first indication information received by the receiving module 1501 further includes a bearer identifier of the terminal device. The bearer identifier is used for indicating that data on a bearer corresponding to the bearer identifier of the terminal device is scheduled by the node or is scheduled by the second node.

The receiving module is specifically configured to: receive a PDCP PDU or an IP PDU sent by the second node; or receive a MAC PDU sent by the second node; or receive PHY layer data sent by the second node.

The MAC PDU received by the receiving module includes: a MAC PDU that is processed by using a scheduling function of a MAC layer; or a MAC PDU that is processed by using a scheduling function of a MAC layer and a HARQ function of the MAC layer.

The processing module is specifically configured to:

if the node receives the MAC PDU, perform PHY layer processing and radio frequency function processing on the MAC PDU; if the node receives the PHY layer data, perform radio frequency function processing on the PHY layer data; if the node receives the PDCP PDU, perform RLC layer processing, MAC layer scheduling function processing, physical layer processing, and radio frequency function processing on the PDCP PDU; or if the node receives the IP PDU, perform PDCP layer processing, RLC layer processing, MAC layer scheduling function processing, physical layer processing, and radio frequency function processing on the IP PDU.

It should be particularly noted that, in this embodiment of the present disclosure, a physical device corresponding to the receiving module is a receiver, a physical device corresponding to the processing module is a processor and a physical device corresponding to the sending module is a transmitter.

Compared with the prior art, in the solutions provided in the embodiments shown in FIGS. 14, 14a, and 15, whether each terminal device is scheduled by the first node or is scheduled by the second node is dynamically determined based on basic information of the terminal device or network information, so that different scheduling manners (namely, centralized scheduling or distributed scheduling) are implemented for different terminal devices in a cell. Compared with the prior art, in the solution provided in the present disclosure, whether each terminal device is scheduled by the first node or is scheduled by the second node is dynamically determined based on basic information of the terminal device and/or network information, so that different scheduling manners (namely, centralized scheduling or distributed scheduling) are implemented for different terminal devices in a cell. In this case, compared with a centralized scheduling architecture mentioned in BACKGROUND, because distributed scheduling is used for some terminal devices in a cell, a bandwidth requirement of the transmission network is reduced. Compared with a distributed scheduling architecture mentioned in BACKGROUND, because centralized scheduling may be used for a terminal device located at a cell edge, system performance of the cell is improved.

The methods or algorithm steps described with reference to the content disclosed in the present disclosure may be implemented in a hardware manner, or may be implemented in a manner of executing a software instruction by a processor. The software instruction may include a corresponding software module. The software module may be stored in a RAM memory, a flash memory, a ROM memory, an EPROM memory, an EEPROM memory, a register, a hard disk, a removable hard disk, a CD-ROM memory, or a storage medium in any other forms well-known in the art. A storage medium used as an example is coupled to the processor so that the processor can read information from the storage medium, and can write information into the storage medium. Certainly, alternatively, the storage medium may be a part of the processor. The processor and the storage medium may be located in an ASIC. In addition, the ASIC may be located in the user equipment. Certainly, the processor and the storage medium may also exist in the user equipment as discrete components.

A person of skill in the art should be aware that in one or more of the foregoing examples, the functions described in the present disclosure may be implemented by hardware, software, firmware, or any combination thereof. When this application is implemented by software, these functions maybe stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general or dedicated computer.

The objectives, technical solutions, and benefits of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement, or improvement made within the spirit and principle of the present disclosure shall fall within the protection scope of the present disclosure.

What is claimed is:

1. A data transmission method for use in a network comprising at least one first node and at least one second node, wherein both the first node and the second node have a scheduling function, the method comprising:
   determining, by the second node, first indication information based on at least one of basic information of a terminal device or network information, and sending the first indication information to the first node for indicating that the terminal device is scheduled by the first node or is scheduled by the second node;
   when the first indication information indicates that the terminal device is scheduled by the first node, sending, by the second node to the first node, a data packet that has not been processed by using the scheduling function of the second node; and
   when the first indication information indicates that the terminal device is scheduled by the second node, sending, by the second node to the first node, a data packet that has been processed by using the scheduling function of the second node.

2. The method according to claim 1, further comprising:
   when at least one of the basic information of the terminal device or the network information is changed, negotiating, by the second node, with the first node to change a scheduling node; and
   determining, by the second node, second indication information based on at least one of the changed basic information of the terminal device or the changed network information, and sending the second indication information to the first node for indicating that scheduling of the terminal device by the second node is changed to scheduling of the terminal device by the first node, or for indicating that scheduling of the terminal device by the first node is changed to scheduling of the terminal device by the second node.

3. The method according to claim 1, wherein the first indication information comprises a scheduling indication or a bearer type indication.

4. The method according to claim 1, wherein the first indication information further comprises a bearer identifier of the terminal device for indicating that data on a bearer corresponding to the bearer identifier of the terminal device is scheduled by the first node or is scheduled by the second node.

5. The method according to claim 1, wherein sending, by the second node to the first node, the data packet that has not been processed by using the scheduling function of the second node comprises:
   sending, by the second node, a packet data convergence protocol (PDCP) packet data unit (PDU) or an Internet Protocol (IP) PDU to the first node.

6. A data transmission method for use in a network comprising at least one first node and at least one second node, wherein both the first node and the second node have a scheduling function, the method comprising:
   receiving, by the first node, first indication information for indicating that a terminal device is scheduled by the first node or is scheduled by the second node;
   when the first indication information indicates that the terminal device is scheduled by the first node, receiving, by the first node, a data packet sent by the second node and that has not been processed by using the scheduling function of the second node, and after processing, by the first node, the data packet that has not been processed by using the scheduling function of the second node, sending the data packet to the terminal device; and
   when the first indication information indicates that the terminal device is scheduled by the second node, receiving, by the first node, a data packet sent by the second node and that has been processed by using the scheduling function of the second node, and after processing, by the first node, the data packet that has been processed by using the scheduling function of the second node, sending the data packet to the terminal device.

7. The method according to claim 6, further comprising:
   when at least one of basic information of a terminal device or network information is changed, negotiating, by the second node, with the first node to change a scheduling node; and
   receiving, by the first node, second indication information sent by the second node, wherein the second indication information is determined by the second node based on at least one of the changed basic information of a terminal device or the changed network information, and the second indication information indicates that scheduling of the terminal device by the second node is changed to scheduling of the terminal device by the first node, or scheduling of the terminal device by the first node is changed to scheduling of the terminal device by the second node.

8. The method according to claim 7, wherein the first indication information received by the first node further comprises a bearer identifier of the terminal device for indicating that data on a bearer corresponding to the bearer identifier of the terminal device is scheduled by the first node or is scheduled by the second node.

9. The method according to claim 7, wherein receiving, by the first node, the data packet sent by the second node and that has not been processed by using the scheduling function of the second node comprises:
   receiving, by the first node, a packet data convergence protocol (PDCP) packet data unit (PDU) or an Internet Protocol (IP) PDU sent by the second node.

10. The method according to claim 7, wherein receiving, by the first node, the data packet sent by the second node and that has been processed by using the scheduling function of the second node comprises:
    receiving, by the first node, a media access control (MAC) PDU sent by the second node; or
    receiving, by the first node, physical (PHY) layer data sent by the second node.

11. A data transmission node, wherein both the data transmission node and a first node have a scheduling function, the data transmission node comprising:
    a processor, configured to determine first indication information based on at least one of basic information of a terminal device or network information for indicating that the terminal device is scheduled by the first node or is scheduled by the data transmission node; and
    a transmitter, configured to:
    send, to the first node, the first indication information determined by the processor,
    when the first indication information determined by the processor indicates that the terminal device is scheduled by the first node, send, to the first node, a data packet that has not been processed by using the scheduling function of the data transmission node, and
    when the first indication information determined by the processor indicates that the terminal device is scheduled by the data transmission node, send, to the first node, a data packet that has been processed by using the scheduling function of the data transmission node.

12. The data transmission node according to claim 11, wherein:
the processor is further configured to: when at least one of the basic information of a terminal device or the network information is changed, negotiate with the first node to change a scheduling node, and determine second indication information based on at least one of the changed basic information of a terminal device or the changed network information; and
the transmitter is configured to send the second indication information determined by the processor to the first node for indicating that scheduling of the terminal device by the first node is changed to scheduling of the terminal device by the data transmission node, or for indicating that scheduling of the terminal device by the first node is changed to scheduling of the terminal device by the data transmission node.

13. The data transmission node according to claim 11, wherein the first indication information sent by the transmitter comprises a scheduling indication or a bearer type indication.

14. The data transmission node according to claim 11, wherein the first indication information sent by the transmitter further comprises a bearer identifier of the terminal device for indicating that data on a bearer corresponding to the bearer identifier of the terminal device is scheduled by the first node or is scheduled by the data transmission node.

15. The data transmission node according to claim 11, wherein the transmitter is configured to:
send a packet data convergence protocol (PDCP) packet data unit (PDU) or an internet protocol (IP) PDU to the first node;
send a media access controller (MAC) PDU to the first node; or
send physical (PHY) layer data to the first node.

16. A data transmission node, wherein both the data transmission node and a second node have a scheduling function, the data transmission node comprises:
a receiver, configured to:
receive first indication information, wherein the first indication information indicates that a terminal device is scheduled by the data transmission node or is scheduled by the second node, when the terminal device is scheduled by the data transmission node, receive a data packet sent by the second node and that has not been processed by using the scheduling function of the second node, and
when the terminal device is scheduled by the second node, receive a data packet sent by the second node and that has been processed by using the scheduling function of the second node;

a processor, configured to:
process the data packet that is received by the receiver and that has not been processed by using the scheduling function of the second node; and
process the data packet that is received by the receiver and that has been processed by using the scheduling function of the second node; and
a transmitter, configured to send data processed by the processor.

17. The data transmission node according to claim 16, further comprising:
a processor, configured to: when at least one of basic information of a terminal device or network information is changed, negotiate, by the data transmission node, with the second node to change a scheduling node; and
wherein the receiver is configured to: after the processor determines to change the scheduling node, receive second indication information sent by the second node, wherein the second indication information is determined by the second node based on at least one of the changed basic information of a terminal device or the changed network information, and the second indication information indicates that scheduling of the terminal device by the second node is changed to scheduling of the terminal device by the data transmission node, or scheduling of the terminal device by the data transmission node is changed to scheduling of the terminal device by the second node.

18. The data transmission node according to claim 16, wherein the first indication information received by the receiver further comprises a bearer identifier of the terminal device for indicating that data on a bearer corresponding to the bearer identifier of the terminal device is scheduled by the data transmission node or is scheduled by the second node.

19. The data transmission node according to claim 16, wherein the receiver is configured to:
receive a packet data convergence protocol (PDCP) packet data unit (PDU) or internet protocol (IP) PDU sent by the second node;
receive a media access control (MAC) PDU sent by the second node; or
receive physical (PHY) layer data sent by the second node.

20. The data transmission node according to claim 19, wherein the MAC PDU received by the receiver comprises:
a MAC PDU processed by using a scheduling function of a MAC layer; or
a MAC PDU processed by using a scheduling function of a MAC layer and a hybrid automatic repeat request (HARD) function of the MAC layer.

* * * * *